(12) United States Patent
Akhavan Fomani et al.

(10) Patent No.: US 9,958,993 B2
(45) Date of Patent: May 1, 2018

(54) ACTIVE MATRIX CAPACITIVE FINGERPRINT SENSOR WITH 1-TFT PIXEL ARCHITECTURE FOR DISPLAY INTEGRATION

(71) Applicant: SYNAPTICS INCORPORATED, San Jose, CA (US)

(72) Inventors: Arash Akhavan Fomani, Sunnyvale, CA (US); Kirk Hargreaves, Mountain View, CA (US); Patrick Smith, San Jose, CA (US); Petr Shepelev, Campbell, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 44 days.

(21) Appl. No.: 14/788,604

(22) Filed: Jun. 30, 2015

(65) Prior Publication Data

US 2017/0003777 A1    Jan. 5, 2017

(51) Int. Cl.
| | |
|---|---|
| *G06F 3/045* | (2006.01) |
| *G06F 3/044* | (2006.01) |
| *G06K 9/00* | (2006.01) |
| *G06F 3/041* | (2006.01) |

(52) U.S. Cl.
CPC ............ *G06F 3/044* (2013.01); *G06F 3/0412* (2013.01); *G06F 3/0416* (2013.01); *G06K 9/0002* (2013.01)

(58) Field of Classification Search
CPC ...... G06F 3/0412; G06F 3/0414; G06F 3/044; G06F 2300/04102
USPC .................................................. 345/173–178
See application file for complete search history.

(56) References Cited

U.S. PATENT DOCUMENTS

| | | | |
|---|---|---|---|
| 5,325,442 A | 6/1994 | Knapp | |
| 5,978,496 A | 11/1999 | Harkin | |
| 6,411,727 B1 | 6/2002 | Harkin | |
| 6,657,269 B2 | 12/2003 | Migliorato et al. | |
| 6,681,033 B1 | 1/2004 | Yano et al. | |
| 6,937,031 B2 | 8/2005 | Yoshioka et al. | |
| 7,053,633 B2 | 5/2006 | Hara | |
| 7,078,917 B2 | 7/2006 | Yoshida et al. | |
| 7,081,765 B2 | 7/2006 | Miyasaka et al. | |
| 7,091,726 B2 | 8/2006 | Sano et al. | |
| 7,126,349 B2 | 10/2006 | Hara | |

(Continued)

FOREIGN PATENT DOCUMENTS

WO    WO-2014099947 A1    6/2014

OTHER PUBLICATIONS

PCT/US/2016039211, International Search Report and Written Opinion dated Nov. 18, 2016, consists of 13 pages.

*Primary Examiner* — Vijay Shankar
(74) *Attorney, Agent, or Firm* — Patterson + Sheridan, LLP

(57) ABSTRACT

Embodiments described herein include a method for operating an input device by applying a charge voltage to a sense element through a first transistor that is between the sense element and a column output line and a first switch that is between the column output line and a drive voltage. The method also includes storing an electric charge on the sense element, wherein the electric charge comprises a magnitude corresponding to a feature of an input object. The method also includes driving a gate terminal of the first transistor low and disconnecting the charge voltage via the first switch. The method further includes transferring the electric charge to a feedback capacitor.

20 Claims, 34 Drawing Sheets

(56) References Cited

U.S. PATENT DOCUMENTS

| | | |
|---|---|---|
| 7,126,350 B2 | 10/2006 | Miyasaka |
| 7,127,089 B2 | 10/2006 | Miyasaka |
| 7,196,528 B2 | 3/2007 | Ebihara |
| 7,616,146 B2 * | 11/2009 | Sakakibara ......... H03M 1/0658 |
| | | 341/155 |
| 7,683,638 B2 | 3/2010 | Chuang et al. |
| 7,683,640 B2 | 3/2010 | Chuang et al. |
| 7,755,369 B2 | 7/2010 | Chuang et al. |
| 8,044,943 B2 * | 10/2011 | Chen ...................... G06F 3/042 |
| | | 178/18.09 |
| 8,711,128 B2 | 4/2014 | Small et al. |
| 8,723,841 B2 * | 5/2014 | Ishizaki .................. G06F 3/044 |
| | | 178/18.01 |
| 8,766,950 B1 * | 7/2014 | Morein .................. G06F 3/044 |
| | | 345/173 |
| 8,797,294 B2 * | 8/2014 | Souchkov ............... G06F 3/044 |
| | | 178/18.03 |
| 8,860,685 B2 * | 10/2014 | Takeuchi ............. G06F 3/0412 |
| | | 178/18.06 |
| 9,244,581 B2 * | 1/2016 | Morein ................. G06F 3/0412 |
| 9,436,315 B2 * | 9/2016 | Krah .................... G06F 3/0418 |
| 2008/0303705 A1 | 12/2008 | Sakakibara |
| 2009/0295754 A1 | 12/2009 | Chen |
| 2010/0072471 A1 | 3/2010 | Yamazaki et al. |
| 2010/0328259 A1 * | 12/2010 | Ishizaki .................. G06F 3/044 |
| | | 345/174 |
| 2011/0090184 A1 | 4/2011 | Yamazaki et al. |
| 2013/0069904 A1 | 3/2013 | Krah |
| 2013/0314148 A1 | 11/2013 | Kang et al. |
| 2013/0342507 A1 | 12/2013 | Souchkov |
| 2014/0266262 A1 | 9/2014 | Taghibakhsh |
| 2014/0354596 A1 | 12/2014 | Djordjev et al. |
| 2015/0309531 A1 * | 10/2015 | Tanemura ................ G06F 1/16 |
| | | 345/174 |

* cited by examiner

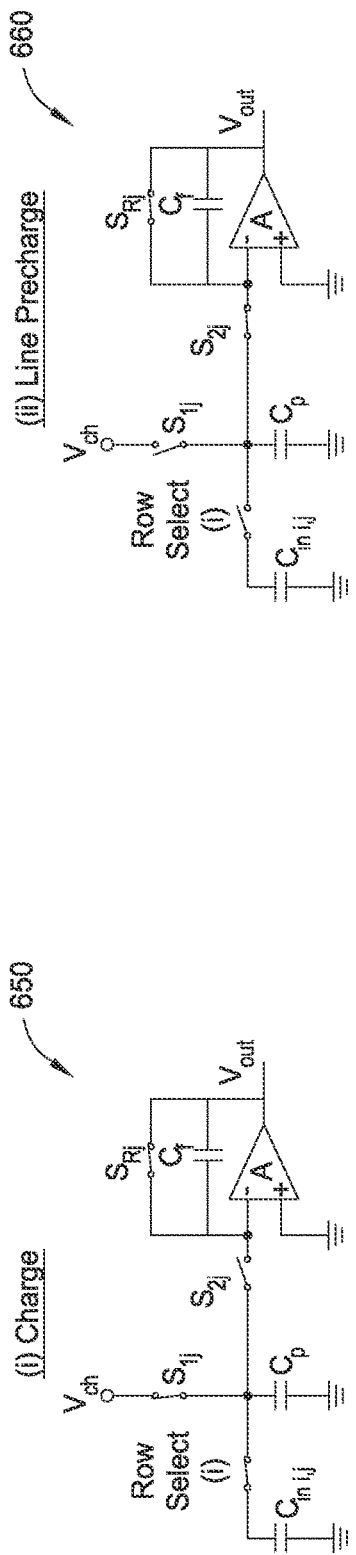
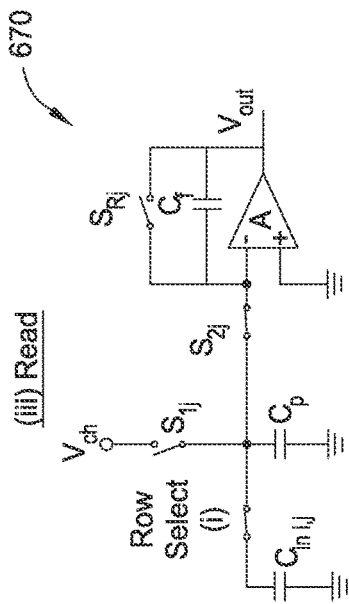
FIG. 6E
FIG. 6F
FIG. 6G

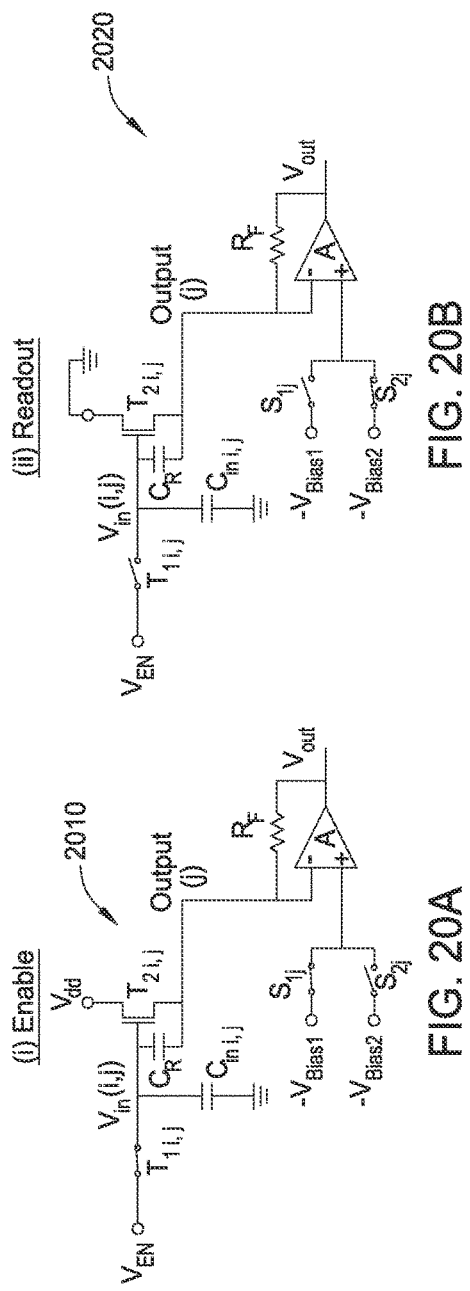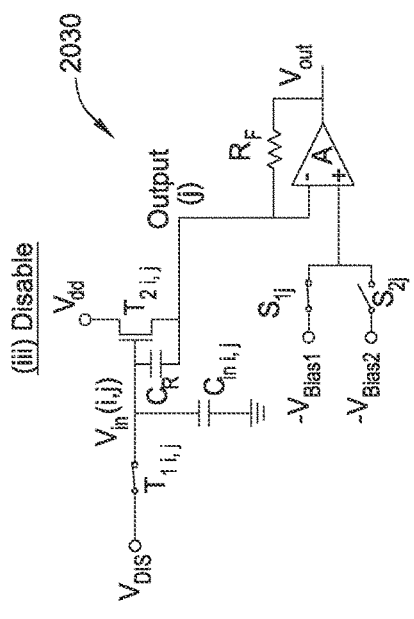
FIG. 20A
FIG. 20B
FIG. 20C

ACTIVE MATRIX CAPACITIVE FINGERPRINT SENSOR WITH 1-TFT PIXEL ARCHITECTURE FOR DISPLAY INTEGRATION

CROSS-REFERENCE TO RELATED APPLICATIONS

This application is related to U.S. patent application Ser. No. 14/788,499, titled "Active Matrix Capacitive Fingerprint Sensor with 2-TFT Pixel Architecture for Display Integration," and U.S. patent application Ser. No. 14/788,532, titled "Active Matrix Capacitive Fingerprint Sensor for Display Integration based on Charge Sensing by a 2-TFT Pixel Architecture," both filed concurrently herewith.

BACKGROUND

Field of the Disclosure

Embodiments of the present invention generally relate to a method and apparatus for touch sensing, and more specifically, to a fingerprint sensor.

Description of the Related Art

Input devices including proximity sensor devices (also commonly called touchpads or touch sensor devices) are widely used in a variety of electronic systems. Input devices also include fingerprint sensors and other biometric sensor devices. A sensor device typically includes a sensing region, often demarked by a surface, in which the sensor device determines the presence, location, motion, and/or features of one or more input objects. Sensor devices may be used to provide interfaces for the electronic system. For example, sensor devices are often used as input devices for larger computing systems (such as opaque touchpads and fingerprint sensors integrated in, or peripheral to, notebook or desktop computers). Sensor devices are also often used in smaller computing systems (such as touch screens integrated in cellular phones).

SUMMARY

Embodiments described herein include a processing system for operating an input device and a method for operating an input device. In one embodiment, a drive/readout circuit includes an amplifier circuit connected to a feedback capacitor and a reset switch, a first switch configured to connect and disconnect a column output line to a drive voltage, and a second switch configured to connect and disconnect the column output line to the amplifier circuit. The drive/readout circuit is configured to apply the drive voltage to a sense element, bias the column output line to ground while the sense element is disconnected from the column output line, and read out a resulting signal from the sense element.

In another embodiment, an input device includes an array of sensing pixels configured to sense an input object in a sensing region. Each of the sensing pixels includes a sense element configured to store an electric charge, wherein the electric charge includes a magnitude corresponding to a feature of the input object. Each of the sensing pixels also includes a first transistor having a gate terminal connected to a row select line, a second terminal connected to a column output line, and a third terminal connected to the sense element. A drive/readout circuit includes an amplifier circuit connected to a feedback capacitor, a reset switch, and a feedback switch. The drive/readout circuit is configured to accumulate a charge onto the feedback capacitor over one or more charge and discharge cycles of the sense element using the feedback switch.

In another embodiment, a method for operating an input device includes applying a charge voltage to a sense element through a first transistor that is between the sense element and a column output line and a first switch that is between the column output line and a drive voltage. The method also includes storing an electric charge on the sense element, wherein the electric charge comprises a magnitude corresponding to a feature of an input object. The method also includes driving a gate terminal of the first transistor low and disconnecting the charge voltage via the first switch. The method further includes transferring the electric charge to a feedback capacitor.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 6E-6G illustrate equivalent circuits of a pixel (i, j) connected to a drive/readout circuit during charge, precharge, and read stages.

FIGS. 20A-20C illustrate equivalent circuits of a pixel (i, j) connected to a drive/readout circuit during enable, readout, and disable stages.

Figure 1:
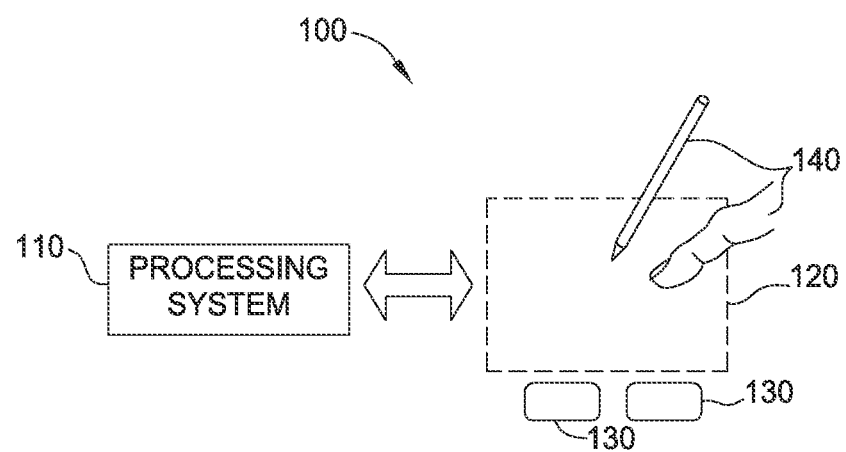
FIG. 1 is a block diagram of a system that includes an input device according to an embodiment.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the embodiments or the application and uses of such embodiments. Furthermore, there is no intention to be bound by any expressed or implied theory presented in the preceding technical field, background, brief summary or the following detailed description.

Various embodiments of the present technology provide input devices and methods for improving usability. Particularly, embodiments described herein provide a fingerprint sensor with increased sensor sensitivity and more accurate measurements. Embodiments also provide reduced thicknesses of layers of glass and layers of substrates. Embodiments also provide sensors with a small number of active elements, which may reduce complexity and save space. Embodiments described herein may also substantially nullify parasitic capacitances. Some embodiments integrate a pixel charge over multiple charge and discharge cycles to make an input signal easier to read. Fingerprint sensors described herein provide minimum impact on the optical performance of a display. Embodiments may reduce or cancel the effect of process variations across a pixel array. Some embodiments may provide a calibration process to cancel the effect of transistor performance variation and device mismatch across the pixel array.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system or can be physically separate from the electronic system. As appropriate, the input device 100 may communicate with parts of the electronic system using any one or more of the following: buses, networks, and other wired or wireless interconnections. Examples include $I^2C$, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in, and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques. Some implementations are configured to provide images that span one, two, three, or higher dimensional spaces. Some implementations are configured to provide projections of input along particular axes or planes. In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, changing the measured capacitive coupling. In one implementation, an absolute capacitance sensing method operates by modulating sensor electrodes with respect to a reference voltage (e.g., system ground) and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals and/or to one or more sources of environmental interference (e.g., other electromagnetic signals). Sensor electrodes may be dedicated transmitters or receivers, or sensor electrodes may be configured to both transmit and receive. Alternatively, the receiver electrodes may be modulated relative to ground.

In FIG. 1, a processing system 110 is shown as part of the input device 100. The processing system 110 is configured to operate the hardware of the input device 100 to detect input in the sensing region 120. The processing system 110 comprises parts of, or all of, one or more integrated circuits (ICs) and/or other circuitry components. For example, a processing system for a mutual capacitance sensor device may comprise transmitter circuitry configured to transmit signals with transmitter sensor electrodes and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100 and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120 or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2A:
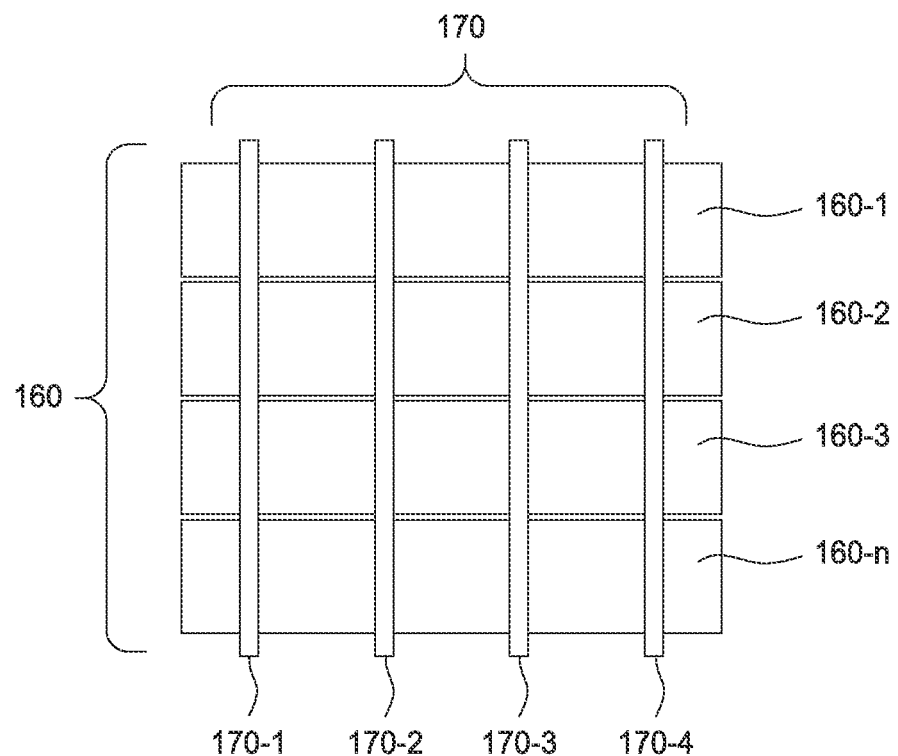
FIGS. 2A and 2B illustrate an example sensor electrode pattern and processing system according to one embodiment.

FIG. 2A shows a portion of an example sensor electrode pattern configured to sense in a sensing region associated with the pattern, according to some embodiments. For clarity of illustration and description, FIG. 2A shows a pattern of simple rectangles, and does not show various components. This sensor electrode pattern comprises a plurality of transmitter electrodes 160 (160-1, 160-2, 160-3, . . . 160-*n*), and a plurality of receiver electrodes 170 (170-1, 170-2, 170-3, . . . 170-*n*) disposed over the plurality of transmitter electrodes 160.

Transmitter electrodes 160 and receiver electrodes 170 are typically ohmically isolated from each other. That is, one or more insulators separate transmitter electrodes 160 and receiver electrodes 170 and prevent them from electrically shorting to each other. In some embodiments, transmitter electrodes 160 and receiver electrodes 170 are separated by insulative material disposed between them at cross-over areas; in such constructions, the transmitter electrodes 160 and/or receiver electrodes 170 may be formed with jumpers connecting different portions of the same electrode. In some embodiments, transmitter electrodes 160 and receiver electrodes 170 are separated by one or more layers of insulative material. In some other embodiments, transmitter electrodes 160 and receiver electrodes 170 are separated by one or more substrates; for example, they may be disposed on opposite sides of the same substrate, or on different substrates that are laminated together.

The areas of localized capacitive coupling between transmitter electrodes 160 and receiver electrodes 170 may be termed "capacitive pixels." The capacitive coupling between the transmitter electrodes 160 and receiver electrodes 170 change with the proximity and motion of input objects in the sensing region associated with the transmitter electrodes 160 and receiver electrodes 170.

In some embodiments, the sensor pattern is "scanned" to determine these capacitive couplings. That is, the transmitter electrodes 160 are driven to transmit transmitter signals. Transmitters may be operated such that one transmitter electrode transmits at one time, or multiple transmitter electrodes transmit at the same time. Where multiple transmitter electrodes transmit simultaneously, these multiple transmitter electrodes may transmit the same transmitter signal and effectively produce an effectively larger transmitter electrode, or these multiple transmitter electrodes may transmit different transmitter signals. For example, multiple transmitter electrodes may transmit different transmitter signals according to one or more coding schemes that enable their combined effects on the resulting signals of receiver electrodes 170 to be independently determined.

The receiver sensor electrodes 170 may be operated singly or multiply to acquire resulting signals. The resulting signals may be used to determine measurements of the capacitive couplings at the capacitive pixels.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

The background capacitance of a sensor device is the capacitive image associated with no input object in the sensing region. The background capacitance changes with the environment and operating conditions, and may be estimated in various ways. For example, some embodiments take "baseline images" when no input object is determined to be in the sensing region, and use those baseline images as estimates of their background capacitances.

Capacitive images can be adjusted for the background capacitance of the sensor device for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels, and determine changes from that baseline image.

In some embodiments, transmitter electrodes 160 comprise one or more common electrodes (e.g., "V-com electrode") used in updating the display of the display screen. These common electrodes may be disposed on an appropriate display screen substrate. For example, the common electrodes may be disposed on the TFT glass in some display screens (e.g., Inplane Switching (IPS) or Plane to Line Switching (PLS)), on the bottom of the color filter glass of some display screens (e.g., Patterned Vertical Alignment (PVA) or Multi-domain Vertical Alignment (MVA)), etc. In such embodiments, the common electrode can also be referred to as a "combination electrode", since it performs multiple functions. In various embodiments, each transmitter electrode 160 comprises one or more common electrodes. In other embodiments, at least two transmitter electrodes 160 may share at least one common electrode.

In various embodiments, the "capacitive frame rate" (the rate at which successive capacitive images are acquired) may be the same or be different from that of the "display frame rate" (the rate at which the display image is updated, including refreshing the screen to redisplay the same image). In some embodiments where the two rates differ, successive capacitive images are acquired at different display updating states, and the different display updating states may affect the capacitive images that are acquired. That is, display updating affects, in particular, the background capacitive image. Thus, if a first capacitive image is acquired when the display updating is at a first state, and a second capacitive image is acquired when the display updating is at a second state, the first and second capacitive images may differ due to differences in the background capacitive image associated with the display updating states, and not due to changes in the sensing region. This is more likely where the capacitive sensing and display updating electrodes are in close proximity to each other, or when they are shared (e.g. combination electrodes).

For convenience of explanation, a capacitive image that is taken during a particular display updating state is considered to be of a particular frame type. That is, a particular frame type is associated with a mapping of a particular capacitive sensing sequence with a particular display sequence. Thus, a first capacitive image taken during a first display updating state is considered to be of a first frame type, a second capacitive image taken during a second display updating state is considered to be of a second frame type, a third capacitive image taken during a third display updating state is considered to be of a third frame type, and so on. Where the relationship of display update state and capacitive image acquisition is periodic, capacitive images acquired cycle through the frame types and then repeats.

Figure 2B:
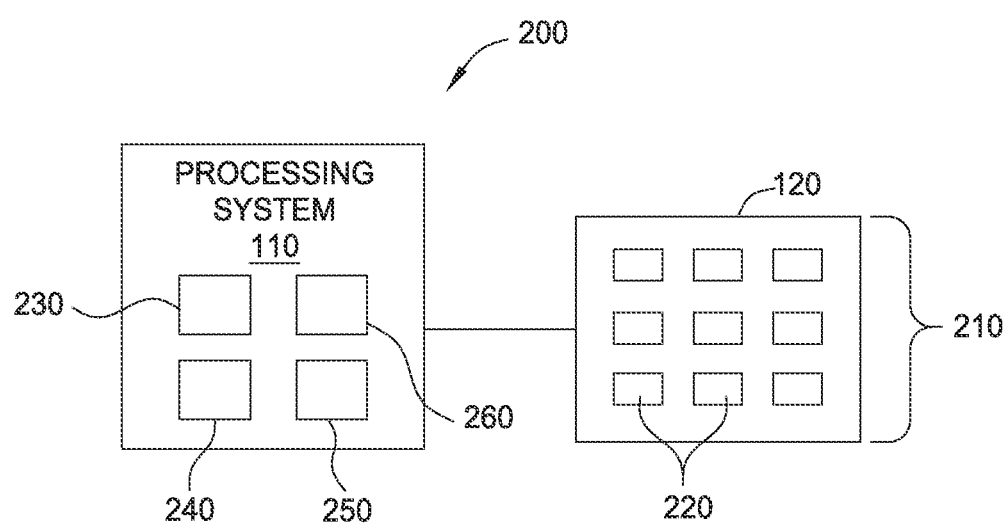

FIG. 2B illustrates a system 200 for sensing an input object according to embodiments of the present disclosure. System 200 comprises an array 210 of sensing pixels in a sensing region 120, each sensing pixel comprising a sense element 220. Sense elements in the embodiments described below could comprise sense plates or any other passive or active elements. Sense elements are operable to determine a feature or effect of an input object. For example, a sense element that is a sense plate could determine a capacitance between the sense plate and an input object, such as a finger. This capacitance can then determine a portion of a fingerprint pattern. The array of sensing elements may also comprise the electrodes described above with respect to FIG. 2A.

Processing system 110 in FIG. 2B is operable to transmit and receive signals to and from array 210. The processing system 110 may include a driver module 230, a receiver module 240, a determination module 250, and an optional memory 260. The receiver module 240 is coupled to the array 210 and configured to receive resulting signals indicative of input (or lack of input) in the sensing region 120 and/or of environmental interference. The receiver module 240 may also be configured to pass the resulting signals to the determination module 250 for determining the presence of an input object (such as a finger) and/or to the optional memory 260 for storage. In various embodiments, integrated circuits in the processing system 110 may be coupled to drivers for sending signals to array 210. The drivers may be fabricated using thin-film-transistors (TFT) and may comprise switches, combinatorial logic, multiplexers, and other selection and control logic.

The driver module 230, which includes driver circuitry, included in the processing system 110 may be configured for sending signals to array 210. The driver module 230 may send signals that set row select, enable, or supply lines high or low, as described in further detail below. The driver module 230 may produce signals that turn switches on or off as described in further detail below. Processing system 110 may be implemented with more circuitry to control the various components described in the example embodiments below.

Embodiments described below comprise fingerprint sensors utilizing thin-film transistors (TFTs). Fingerprint sensors can be incorporated into a display in certain embodiments. For a fingerprint sensor incorporated into a display, the fingerprint sensor elements may be incorporated near a top surface of the display to improve the quality of a signal captured to detect fine features of a fingerprint. The sense elements for fingerprint sensing described below could be incorporated in an entire active area of a display, or in only a part of the active area of the display. The sense elements may have a pixel density that matches the pixel density of the display pixels, in which case a sense element could be incorporated in every pixel of the display, or in every pixel of the relevant portion of the active area configured for fingerprint sensing. The sense elements could also have a pixel density that is greater or less than the pixel density of the display, and if the sensing pixels have a pixel density greater than the display then multiple sense elements of the fingerprint sensor could be incorporated in a single display pixel. Input device 100, described above with respect to FIG. 1, comprises a fingerprint sensor in certain embodiments described herein.

Fingerprint sensors detect the valleys and ridges of fingerprints. One technique for detecting a fingerprint comprises detecting changes in sensor capacitances along valleys and ridges of the fingerprint to get an image of the fingerprint, which may be all or a portion of the complete fingerprint pattern of a user's finger. A cover layer may be employed over the fingerprint sensor to protect the sensor. The cover layer can protect display elements and/or proximity sensor elements in addition to fingerprint sensor elements. The cover layer may be made of an opaque material, or a transparent material, such as glass. This cover layer may be 500 microns or less in some embodiments. With fingerprint sensing, capacitances may be measured on the order of $10^{-18}$ F. A valley depth in a fingerprint may be approximately 60 microns. Ridge-to-ridge spacing may be approximately 400 microns. A thickness of a ridge may be 100-300 microns. Therefore a pixel size for a fingerprint sensor of around 40-70 microns on a side may be sufficient to capture ridge and valley information of a fingerprint. A pixel pitch of around 40-70 microns may also be sufficient to capture ridge and valley information of a fingerprint. Pixel pitch may be 20-100 microns in some embodiments. Smaller pixel sizes and/or pixel pitches can be used to capture smaller features, such as sweat pores, in addition to ridge and valley information of a fingerprint.

With many sensor pixels, it is difficult to place 6 or more TFTs for each pixel to operate a fingerprint sensor due to space constraints. Embodiments described below can work with as few as 1 TFT or 2 TFTs for each sensing pixel. The architectures described below could be discrete or incorporated in a display. In addition, architectures described below can produce waveforms large enough to nullify parasitic capacitances.

Operational amplifiers described in embodiments below can be low voltage integrated circuits or may be embodied on a panel. Switches described below may be in an integrated circuit or embodied on a non-conductive supporting substrate, such as glass or plastic. MEMS (micro-electromechanical) switches may be utilized and may be formed on a supporting substrate or in an integrated circuit. Switches and transistors may be formed in semiconductor wafers or may be TFTs. Sense elements in the embodiments described below could comprise sense plates, PN diodes, piezoelectric transducers that sense ultrasonic waves, or any passive or active elements that accumulate a charge or transduce an excitation into a charge in the presence of an input object, such as a finger.

Embodiments described below that sense a capacitance associated with an input object may measure absolute capacitance or trans capacitance. Absolute capacitance measures a capacitance between the input object and a sense element. Trans capacitance measures a change in capacitance between two sense electrodes due to the presence of an input object.

Embodiments described below may integrate a charge over multiple cycles to more easily capture the fingerprint.

Features described in separate embodiments below may be combined, removed, or incorporated into the other embodiments where appropriate.

Figure 3:
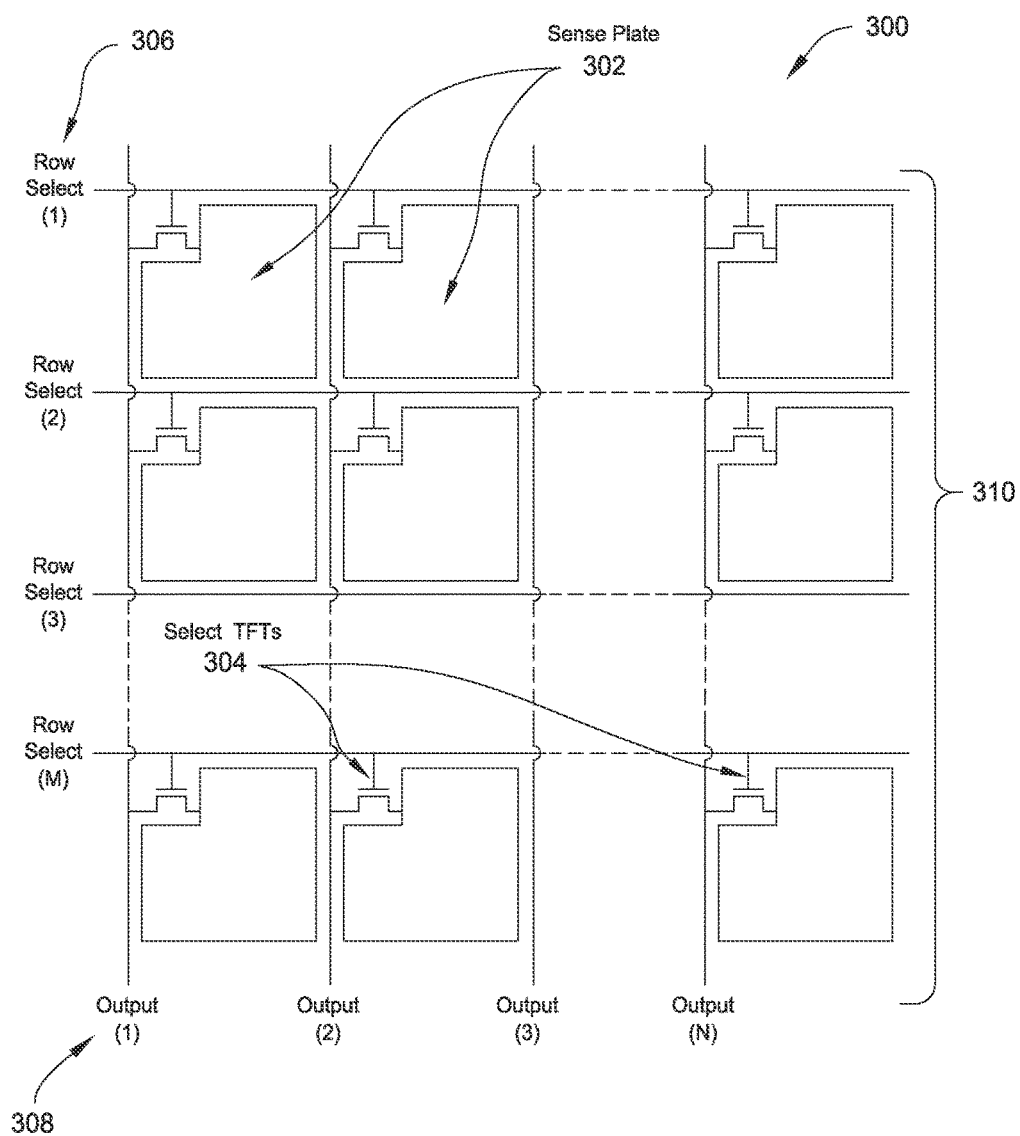
FIG. 3 illustrates a 1-TFT pixel architecture for an active matrix capacitive fingerprint sensor according to one embodiment.

Active Matrix Capacitive Fingerprint Sensor with 1-TFT Pixel Architecture for Display Integration FIG. 3 illustrates a pixel architecture for an active matrix capacitive fingerprint sensor according to one embodiment. Architecture 300 may operate with as few as one TFT in each sensing pixel. Architecture 300 comprises an array 310 of sense elements 302 (in this example, the sense elements 302 comprise sense plates 302) each addressed through a select thin-film transistor (TFT) 304 controlled by a row of addressing lines (row select 306). Each column of sense plates 302 is connected to a common output line 308. When a row is selected, sense plate 302 of each column is connected to the common output line 308 of that column through the respective TFT 304. The TFT 304 may be in-cell if the sensor is integrated in a display.

The array 310 of architecture 300 may use as few as one TFT per pixel, one output line per column, and one address line per row which reduces the impact on the optical performance of the display. An external circuit (described in further detail below) comprising four switches, a feedback capacitance, and a high gain operational amplifier provides cancellation of the parasitic capacitance of the output line. In addition, integration of the pixel charge can be performed over multiple charge and discharge cycles in some embodiments.

Figure 4A:
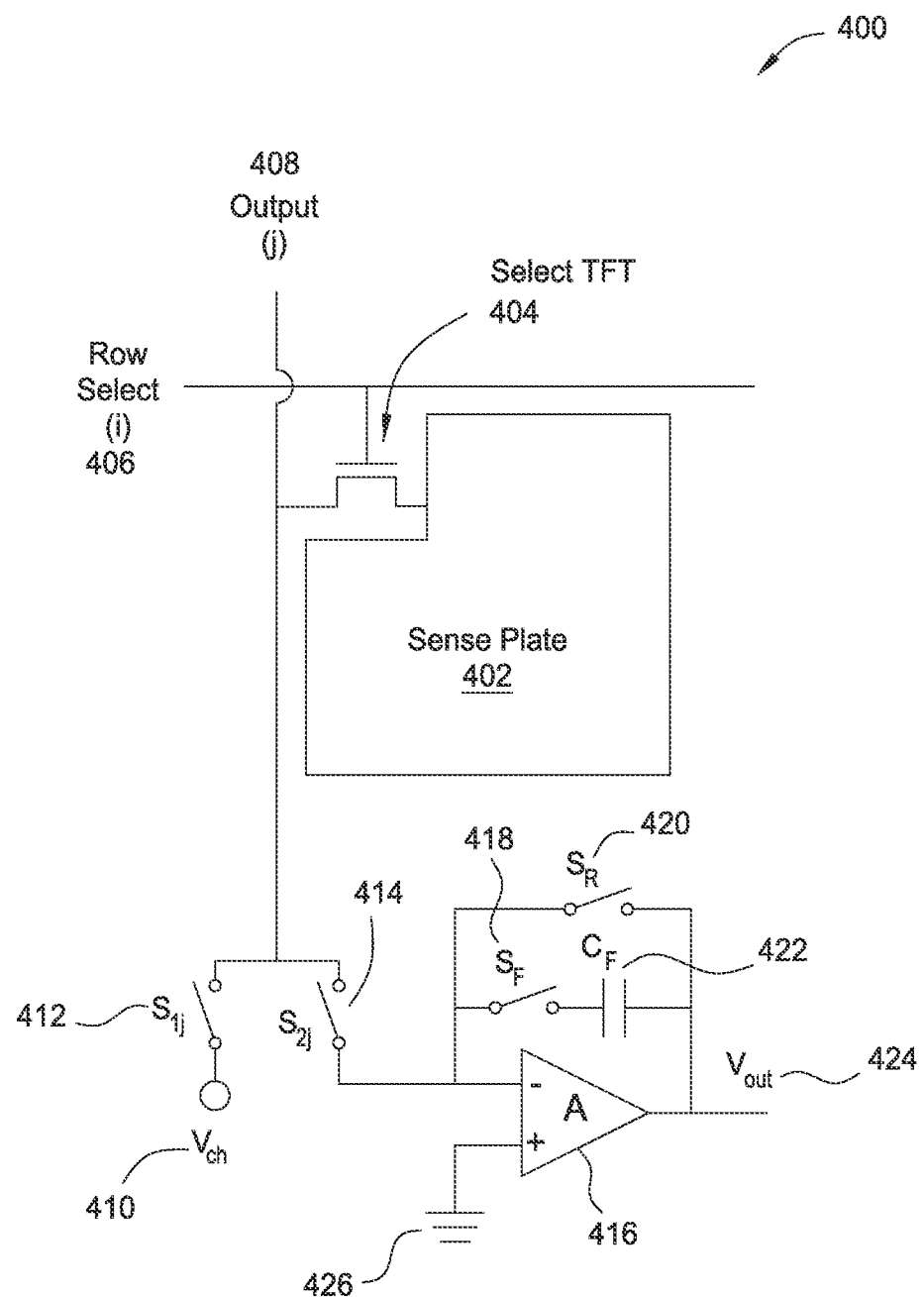
FIGS. 4A-4B illustrate schematics for a drive/readout circuit.

FIG. 4A illustrates a schematic for a drive/readout circuit 400 of a column j connected to sense plate 402 at row $406_i$ and column 408. Select TFT 404 is coupled to row select line $406_i$ and output line 408. Drive/readout circuit 400 also comprises four switches: $S_{1j}$ 412, $S_{2j}$ 414, $S_F$ 418, and $S_R$ 420. The feedback network comprises feedback capacitance $C_F$ 422 and reset switch $S_R$ 420, and the amplifier circuit comprises operational amplifier 416. Switch $S_{1j}$ 412 charges the sense plate 402 by coupling the plate to $V_{ch}$ 410 through select TFT 404. Switch $S_{2j}$ 414 is utilized for readout of the stored charge on sense plate 402. Feedback switch $S_F$ 418 connects and disconnects the feedback capacitance $C_F$ 422 to an input of the operational amplifier 416. Reset switch $S_R$ 420 resets the state of drive/readout circuit 400 between subsequent readout of the rows i. Feedback capacitance $C_F$ 422 provides feedback to operational amplifier 416, which has one input coupled to ground 426. In some embodiments a clock signal may be coupled to an input terminal of the operational amplifier 416.

Figure 5A:
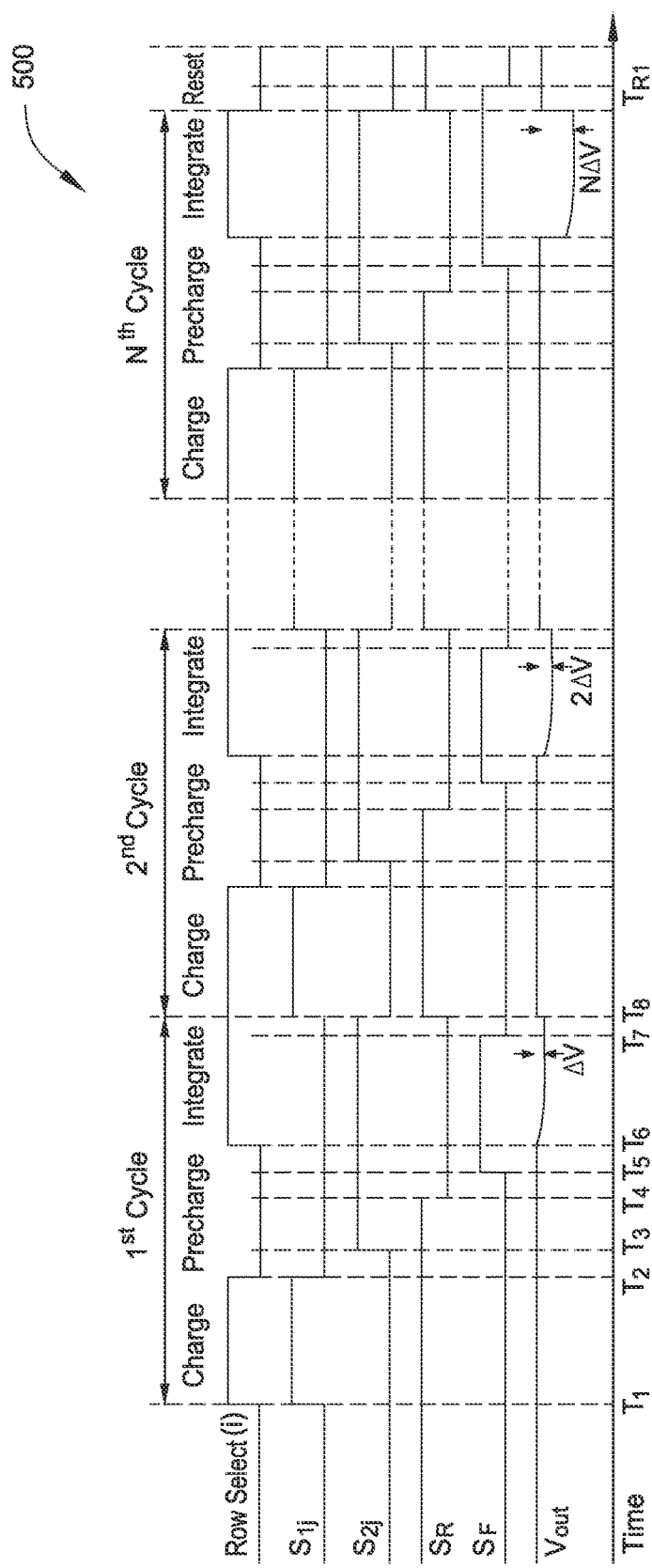
FIGS. 5A-5B illustrate timelines that comprises signal waveforms during a drive/readout sequence.

FIG. 5A illustrates timeline 500 that comprises signal waveforms during the drive/readout sequence in accordance with FIGS. 3 and 4A. A 3-step sequence is used to transfer the charge on the capacitance formed between the sense plate 402 and a finger to the feedback capacitance $C_F$ 422. This capacitance contains the information related to the topography of the finger surface. The charge can be integrated during multiple charge/discharge cycles to increase the amplitude of the output signal by repeating the 3-step sequence. FIG. 5A illustrates the waveforms of the row select $406_i$ and control signal of the switches $S_{1j}$, $S_{2j}$, $S_F$, and $S_R$. At time T1, sense plate 402 is connected to the charge voltage $V_{ch}$ 410 through the select TFT 404 and switch $S_{1j}$ 412, i.e. row select $406_i$ and $S_{1j}$ signals are set to High. Meanwhile $S_{2j}$ 414 and feedback switch $S_F$ 418 remain open. Reset switch $S_R$ 420 remains closed. As shown, $S_{2j}$ 414 and $S_F$ 418 are Low and $S_R$ 420 is High. During this time (charge stage), charge is stored on sense plate 402 with a magnitude proportional to the capacitance to the finger.

At time T2, the TFT 404 is disconnected from the output line 408 by turning Row select $406_i$ to Low. $S_{1j}$ 412 is opened ($S_{1j}$ 412 is turned Low) to disconnect the charge voltage $V_{ch}$ 410.

At time T3 (output pre-charge stage), $S_{2j}$ 414 is closed ($S_{2j}$ 414 is turned High) to pre-charge the output line to virtual ground (in the case of a non-ideal operational amplifier, to the input offset voltage of the operational amplifier $V_{os}$).

At time T4, $S_R$ 420 is opened ($S_R$ 420 is turned Low). At Time T5, $S_F$ 418 is closed to configure the circuit for readout of the stored charge. At time T6 (Integrate stage), Row select $406_i$ is closed to transfer the charge to $C_F$ 422 and consequently change the output voltage 424 to a value proportional to the stored charge on the sense plate 402.

At time T7, $S_F$ 418 is opened ($S_F$ 418 is turned Low) to disconnect the feedback capacitance $C_F$ 422 from the operational amplifier 416 and retain the charge on $C_F$ 422. At time T8, the circuit can enter another charging stage by connecting the charge voltage $V_{ch}$ 410 through the select TFT 404 and switch $S_{1j}$ 412; i.e. row select 406$_i$ and $S_{1j}$ 412 signals are set to High. Meanwhile, $S_{2j}$ 414 is opened, $S_R$ 420 is closed, and $S_F$ 418 remains open ($S_{2j}$ 414 turns Low and $S_R$ 420 turns High). By completing another charge/precharge/integrate cycle, the pixel charge can be added to (integrated on) the feedback capacitor 422. At the end of the $N^{th}$ cycle, the output voltage 424 can be sampled and the output can be reset by turning on the $S_R$ switch 420. At time TR1, the $S_F$ 418 is opened ($S_F$ 418 turns Low) to initialize the circuit for another readout sequence.

Figure 6A:
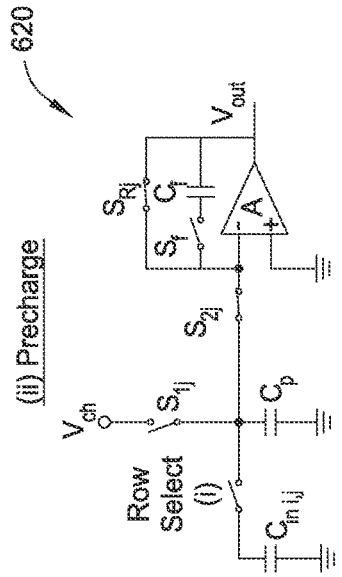
FIGS. 6A-6D illustrate equivalent circuits of a pixel (i, j) connected to a drive/readout circuit during charge, precharge, integrate, and reset stages.
Figure 6C:
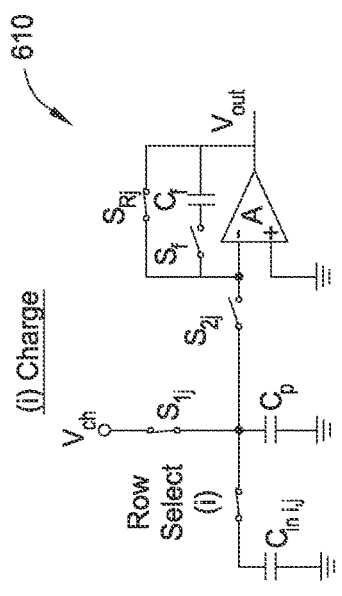
Figure 6B:
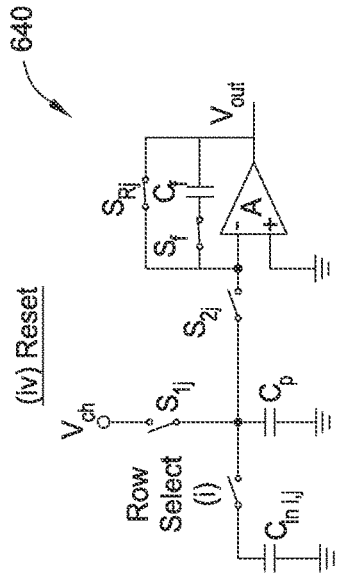
Figure 6D:
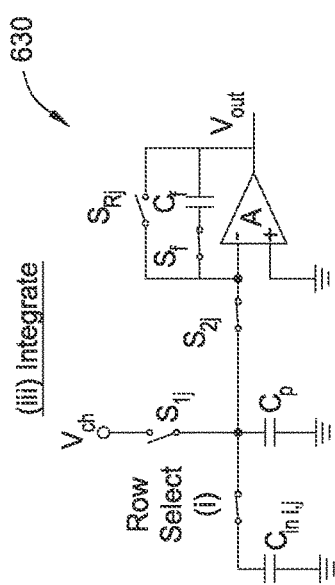

FIGS. 6A-6D illustrate equivalent circuits of a pixel (i, j) connected to the drive/readout circuit of FIG. 4A during charge, precharge, integrate, and reset stages. The sense plate 402 capacitance to the finger is denoted by $C_{in}$ and the parasitic capacitances of the output line are lumped into the capacitance $C_p$. FIG. 6A illustrates the equivalent circuit 610 during a charge stage (T1<t<T2 as illustrated in FIG. 5A). FIG. 6B illustrates the equivalent circuit 620 during a precharge stage (T3<t<T4 as illustrated in FIG. 5A). FIG. 6C illustrates the equivalent circuit 630 during an integrate stage (T6<t<T7 as illustrated in FIG. 5A). FIG. 6D illustrates the equivalent circuit 640 during a reset stage (T7N<t<TR1 as illustrated in FIG. 5A). Isolation of the readout circuit from the charge voltage $V_{ch}$ using switch $S_{2j}$ allows the readout circuit, including the operational amplifier and reset switch $S_R$, to be implemented using lower voltage technology than the drive circuit.

At the end of each charge stage, the sense plate 402 voltage is $V_{in}=V_{ch}$ and the negative terminal of the operational amplifier 416 V-=$V_{out}$=0 (or equals $V_{os}$ close to 0). A charge of $Q_{in}=C_{in}V_{ch}$ is accumulated on sense plate 402. This charge is retained on sense plate 402 by turning off the TFT 404 at the end of the charge stage. During the pre-charge charge stage, the output line 408 is isolated from the power supply and connected to the input of the operational amplifier 416. At the end of the pre-charge stage, the voltage of the output line $V_{ij}$=V-=$V_{out}$=0 (or equals $V_{os}$ close to 0), and the charge stored on $C_F$ 422 is zero. At the end of the first read stage, the voltage of the output line $V_j$=$V_{in}$=V-, $V_{out}$=AV-, and $-V_{CF}$=$V_{out}$-V-=(A-1)V-. If the gain of operational amplifier 416 is large enough, the charge transferred to the parasitic capacitance $C_p$ during the readout of the sense capacitor is negligible compared to the charge transferred to $C_F$, as the voltage of $C_p$ does not change during the readout. Hence, the effect of the parasitic capacitance is cancelled. The $S_F$ 418 is closed during the integration stage to allow charge to be accumulated on the feedback capacitor $C_F$ 422, while $S_F$ 418 is open during charge and precharge stages. The $S_F$ 418 and $S_R$ 420 are closed in the reset stage to discharge the feedback capacitor $C_F$ 422 and reset the output voltage 424.

Figure 4B:
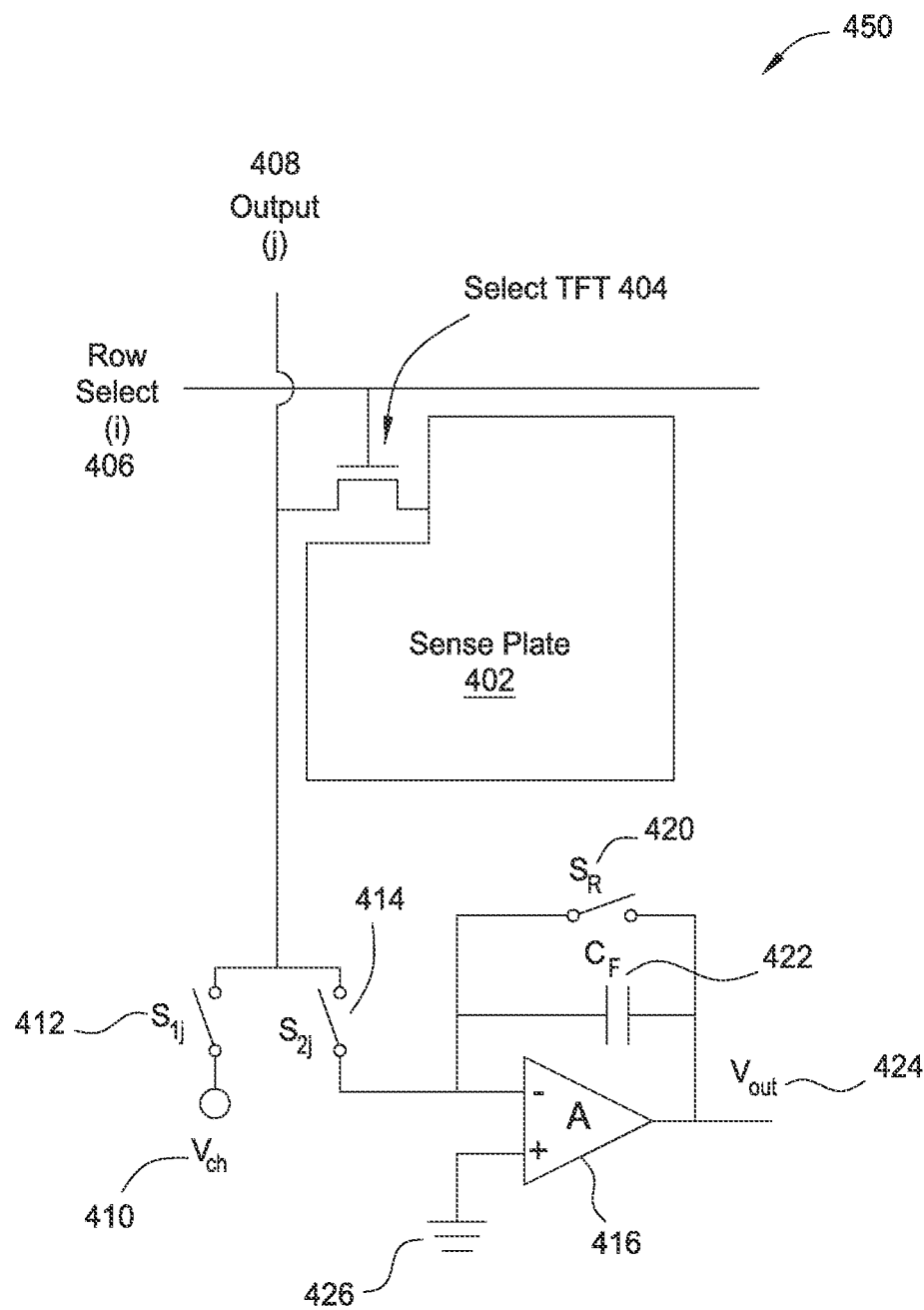

FIGS. 4B, 5B, and 6E-6G are schematic diagrams illustrating another embodiment of a drive/readout circuit. The embodiment illustrated in FIG. 4B is similar to FIG. 4A with the exception of the removal of the feedback switch in FIG. 4B. FIGS. 5B and 6E-6G are also associated with the embodiment of FIG. 4B. FIG. 4B illustrates the schematic of the drive/readout circuit 450 of the column j connected to the sense plate at row i and column j. The readout circuit includes 3 switches ($S_{1j}$ 412, $S_{2j}$ 414, and $S_R$ 420), an operational amplifier 416, and a feedback capacitance $C_F$ 422. Switch $S_{1j}$ 412 is used for charging the plate, switch $S_{2j}$ 414 is used for readout of the stored charge on the sense plate, switch $S_R$ 420 is used to reset the state of the circuit between subsequent readout of the rows, and $C_F$ provides the feedback to the operational amplifier.

Figure 5B:
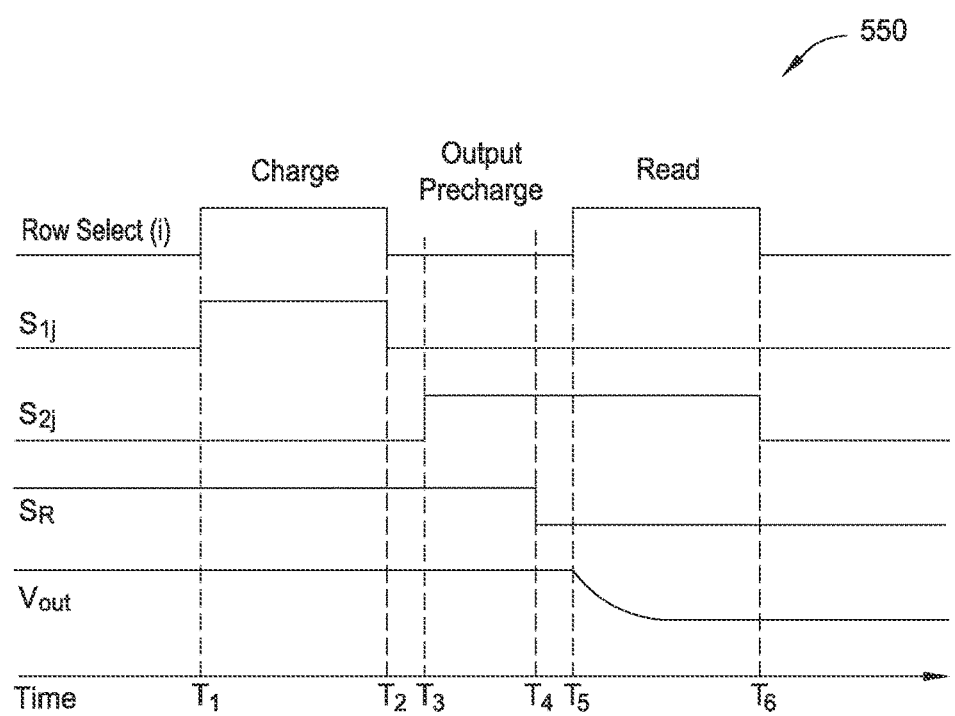

FIG. 5B illustrates timeline 550 that comprises signal waveforms during the drive/readout sequence in accordance with FIGS. 3 and 4B. A 3 step sequence is used to measure the capacitance formed between the sense plate and a finger; this capacitance contains the information related to the topography of the finger surface. FIG. 5B shows the waveforms of the row select (i) and control signal of the switches $S_{1j}$, $S_{2j}$, and $S_R$.

At time $T_1$, the sense plate is connected to the charge voltage $V_{Ch}$ through the select TFT and switch $S_{1j}$; i.e. row select (i) and $S_{1j}$ signals are set to High. Meanwhile $S_{2j}$ remains open and $S_R$ remains closed ($S_{2j}$ is Low and $S_R$ is High). This disconnects the sense plate from the readout circuit and resets the output voltage by discharging the charge stored on feedback capacitance $C_F$. During this time (the charge stage), charge is stored on the sense plate with a magnitude proportional to the capacitance to the finger.

At time $T_2$, the TFT is disconnected from the output line by turning Row select (i) to Low and $S_{1j}$ is opened ($S_{1j}$ is turned Low) to disconnect the charge voltage. At time $T_3$ (output pre-charge stage), $S_{2j}$ is closed ($S_{2j}$ is turned High) to pre-charge the output line to virtual ground (in the case of a non-ideal op-amp to the input offset voltage of the op-amp $V_{os}$). At time $T_4$, $S_R$ is opened ($S_R$ is turned Low) to configure the circuit for readout of the stored charge. At time T5 (Read stage), Row select (i) is closed to transfer the charge to $C_F$ and consequently change the output voltage to a value proportional to the stored charge on the sense plate.

FIGS. 6E-6G illustrate equivalent circuits of a pixel (i, j) connected to the drive/readout circuit of FIG. 4B during charge, precharge, and read stages. The sense plate 402 capacitance to the finger is denoted by $C_{in}$ and the parasitic capacitances of the output line are lumped into the capacitance $C_p$. FIG. 6E illustrates the equivalent circuit 650 during a charge stage (T1<t<T2 as illustrated in FIG. 5B). FIG. 6F illustrates the equivalent circuit 660 during a precharge stage (T3<t<T4 as illustrated in FIG. 5B). FIG. 6G illustrates the equivalent circuit 670 during a read stage (T5<t<T6 as illustrated in FIG. 5B).

With respect to FIGS. 4B, 5B, and 6E-6G, at the end of the charge stage, the plate voltage is $V_{in}=V_{ch}$ and the negative terminal of the op-amp V-=$V_{out}$=0 (or $V_{os}$ close to 0). A charge of $Q_{in}=C_{in}V_{ch}$ is accumulated on the sense plate; this charge is retained on the sense plate by turning off the TFT at the end of the charge stage. During the pre-charge stage, the output line is isolated from the power supply and connected to the input of the operational amplifier. At the end of the pre-charge stage, the voltage of the output line $V_{ij}$=V-=$V_{out}$=0 (or $V_{os}$ close to 0) and the charge stored on $C_F$ is zero. At the end of the read stage, the $V_{ij}$=$V_{in}$=V-, $V_{out}$=AV-, and $-V_{CF}$=$V_{out}$-V-=(A-1) V-. For the case of large enough gain of the operational amplifier, the charge transferred to the parasitic capacitance $C_p$ during the readout of the sense capacitor is negligible compared to the charge transferred to $C_F$ as the voltage of $C_p$ does not change during the readout. Hence the effect of the parasitic capacitance is cancelled.

For a first case, (infinite gain (A) and zero $V_{os}$): $V_-=V_{1j}=0$, as the gain is infinite and the offset voltage is zero. Therefore, the charge stored on the sense plate is transferred to $C_F$.

$$V_{out} = V_- - V_{CF} = -\frac{Q_{in}}{C_F} = -\frac{C_{in}}{C_F} V_{ch}$$

For a second case of a non-ideal operational amplifier:

$$V_{out} = V_- - V_{CF}$$
$$V_{out} = -A(V_- - V_{os}) + V_{cs}$$
$$V_{CF} = \frac{[C_{in}(V_{oh} - V_-) - C_p(V_- - V_{OS})]}{C_F}$$
$$V_{out} = -\left[1 + 1/A \frac{C_{in} + C_p + C_F}{C_F}\right]^{-1} \frac{C_{in}}{C_F} V_{oh} +$$
$$\left[1 + 1/A \frac{C_{in} + C_p + C_F}{C_F}\right]^{-1} \frac{A+1}{A} \frac{1}{C_F} (C_{in} + C_F + C_p/A)V_{OS}$$

To minimize the effect of $C_p$ on the output voltage:

$$1/A \frac{C_{in} + C_p + C_F}{C_F} \ll 1$$

In many practical cases, $C_p \gg C_F \gg C_{in}$, simplifying the condition to:

$$\frac{C_p}{C_F} \ll A$$

Under this condition:

$$V_{out} = -\frac{C_{in}}{C_F} V_{oh} + \frac{C_{in} + C_F}{C_F} V_{os}$$

From this equation, the effect of the offset voltage can be neglected if $V_{ch} \gg V_{os}$.

Figure 7:
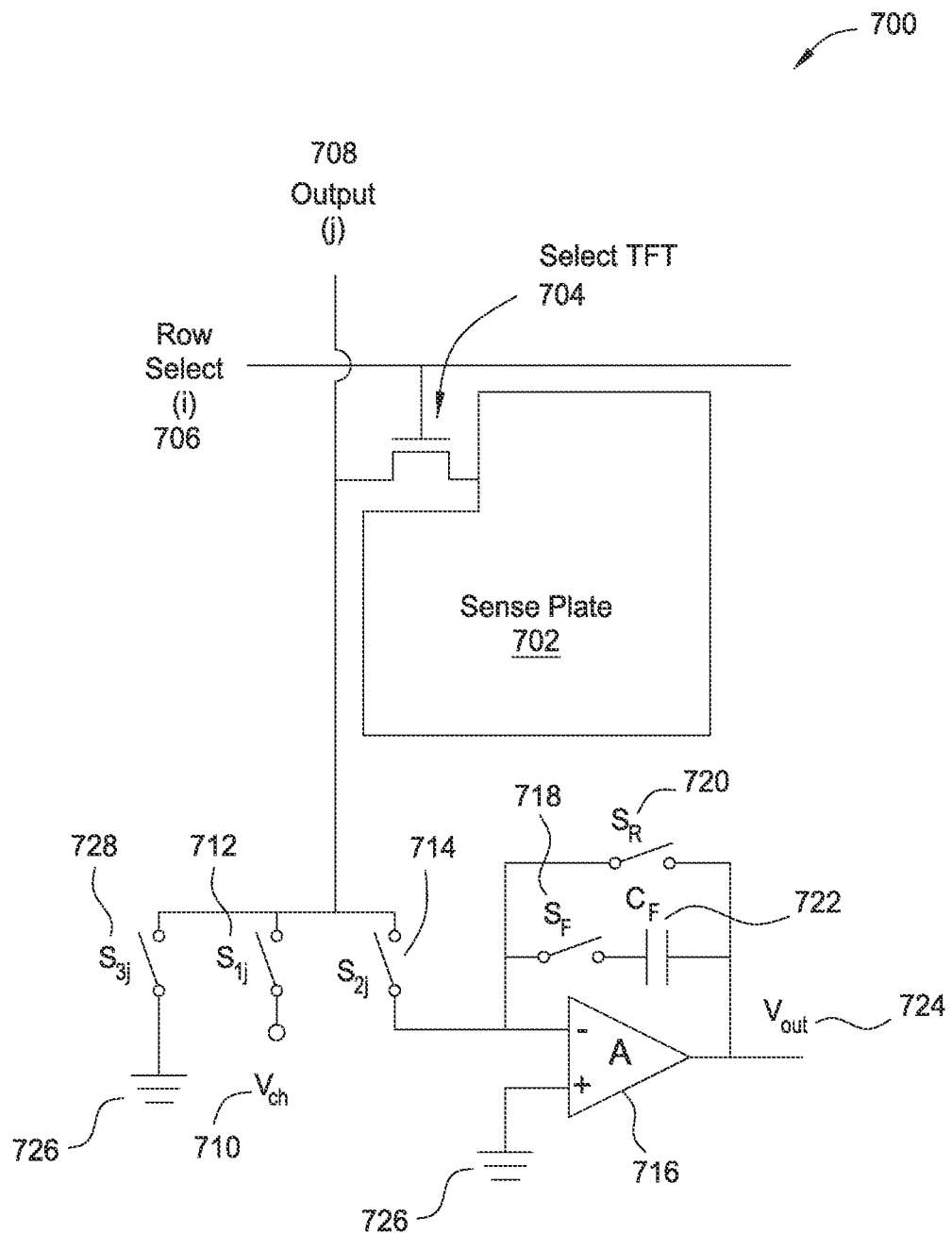
FIG. 7 illustrates a schematic for a drive/readout circuit.

FIG. 7 illustrates a schematic for a drive/readout circuit 700 of a column j connected to sense plate 702 at row 706$_i$ and column 708$_j$. FIG. 7 is similar to FIG. 4A, with the addition of switch $S_{3j}$ 728 added to each column for pre-charging the output line to ground 726. In the embodiments of FIGS. 4-6, the pre-charge state is implemented by connecting the output line to virtual ground through the switch $S_{2j}$ 414 and reset switch $S_R$ 420. In FIG. 7, switch $S_{3j}$ 728 allows the pre-charge state to instead be implemented by connecting the output line 708 directly to system ground 726. Switch $S_{3j}$ 728 can be implemented using a TFT on a display/sensor backplane or using a transistor in a driver circuit. Select TFT 704 is coupled to row select line 706, and output line 708$_j$. Drive/readout circuit 700 comprises four other switches: $S_{1j}$ 712, $S_{2j}$ 714, feedback switch $S_F$ 718, and reset switch $S_R$ 720. Drive/readout circuit 700 further comprises feedback capacitance $C_F$ 722 and operational amplifier 716.

Implementation of the pre-charge switch $S_{3j}$ 728 on the backplane allows the charge integrator to be isolated from the high voltage built up on the output line 708$_j$ during the charging step. This allows implementation of charge integrator using a low-voltage technology for better performance and smaller chip footprint. This also allows for a decrease in the time needed for the pre-charge phase, as the pre-charge switch $S_{3j}$ 728 can have a higher limit on current than a limit in the operational amplifier circuits.

After the charge stage and isolation of the sense plate 702 using select TFT 704, the output line 708 is biased to ground 726 using the pre-charge switch $S_{3j}$ 728. Next, the switch $S_{2j}$ 714 is closed and the output line is connected to the input stage of the integrator. At this stage, select TFT 704 is opened to transfer the charge to the feedback capacitance 722. As the line parasitic capacitance is orders of magnitude larger than the sense plate 702 capacitance, the charge integrator is only exposed to a very small transient voltage. Hence, charging voltages with magnitudes substantially larger than the operating voltage rating of the charge integrator circuit can be employed.

Alternatively, both charging and pre-charging biases can be applied to the output line through $S_{1j}$ 712 using a signal with a proper waveform.

Figure 8:
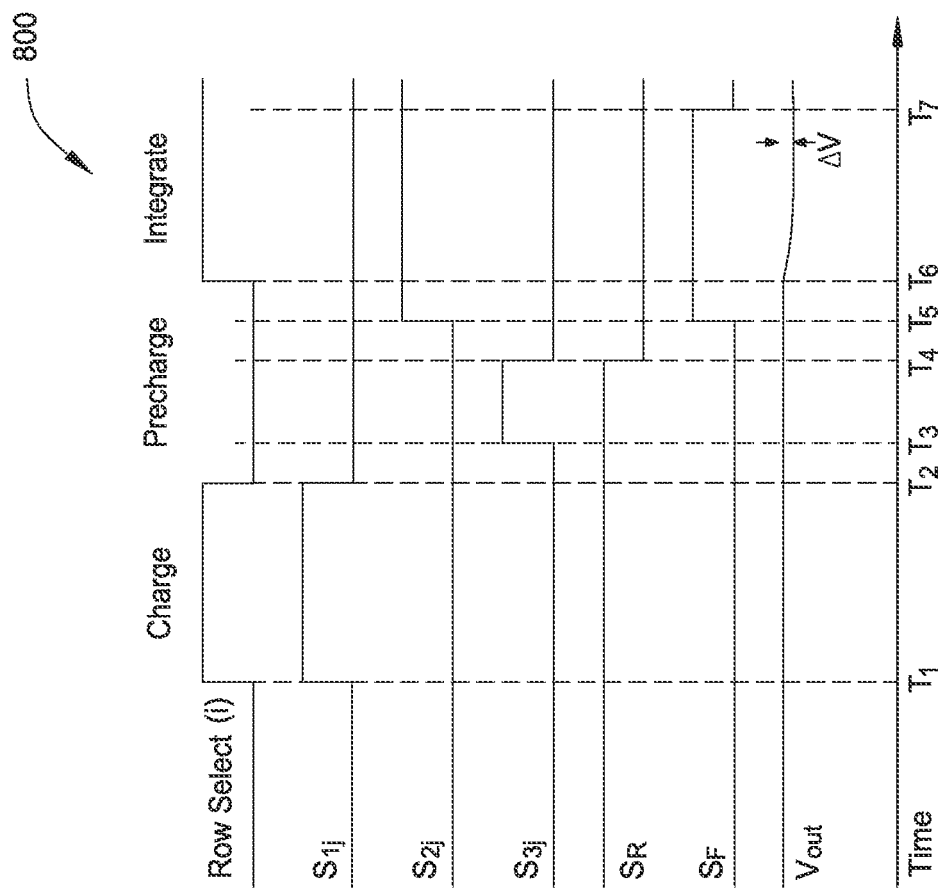
FIG. 8 illustrates a timeline that comprises signal waveforms during a charge/precharge/integrate sequence.

FIG. 8 illustrates timeline 800 that comprises signal waveforms during the charge/precharge/integrate sequence in accordance with FIG. 7. The waveforms are similar to timeline 500 illustrated in FIG. 5A and described in detail above. Timeline 800 introduces the waveform $S_{3j}$ for switch 728. Switch $S_{3j}$ 728 is asserted High during the precharge stage at time T3. Switch $S_{3j}$ 728 is then asserted Low at time T4.

Figure 9:
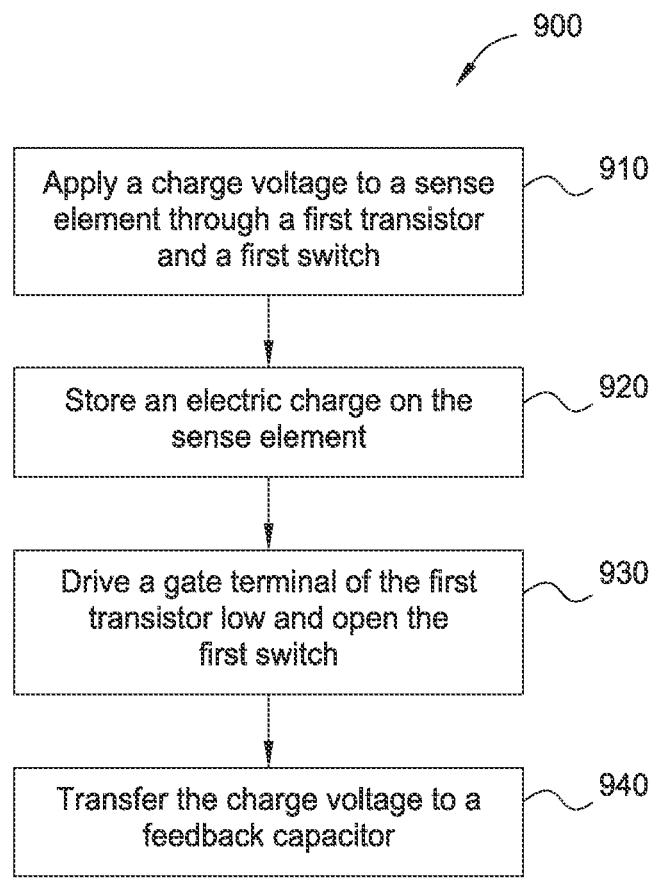
FIG. 9 is a flowchart illustrating a method for operating an input device according to one embodiment.

FIG. 9 is a flowchart illustrating a method 900 for operating an input device, according to one embodiment. The steps of method 900 may be performed in any suitable order. The method begins at step 910, where a driver module applies a charge voltage to a sense element through a first transistor and a first switch. The driver module may also set a row select high at this step. At step 920, an electric charge is stored on the sense element. The electric charge comprises a magnitude proportional to a feature of an input object. This feature may be a capacitance associated with the input object. The feature may be a capacitance between the sense element and the input object. If a finger is the input object and a fingerprint is being sensed, the magnitude of the capacitance is measured to determine the depth of a ridge or valley of a fingerprint.

At step 930, a gate terminal of the first transistor is driven low and the first switch is opened by the driver module to disconnect the charge voltage. The gate terminal can be driven low by driving the row select line to low. At step 940, the charge voltage is transferred to a feedback capacitor. After the charge is transferred to the feedback capacitor, the charge can be read with a readout circuit, or additional cycles may be performed to integrate additional charge on the feedback capacitor before the charge is read out. After the charge is read out, the circuit can be initialized for another drive/readout sequence.

Figure 10:
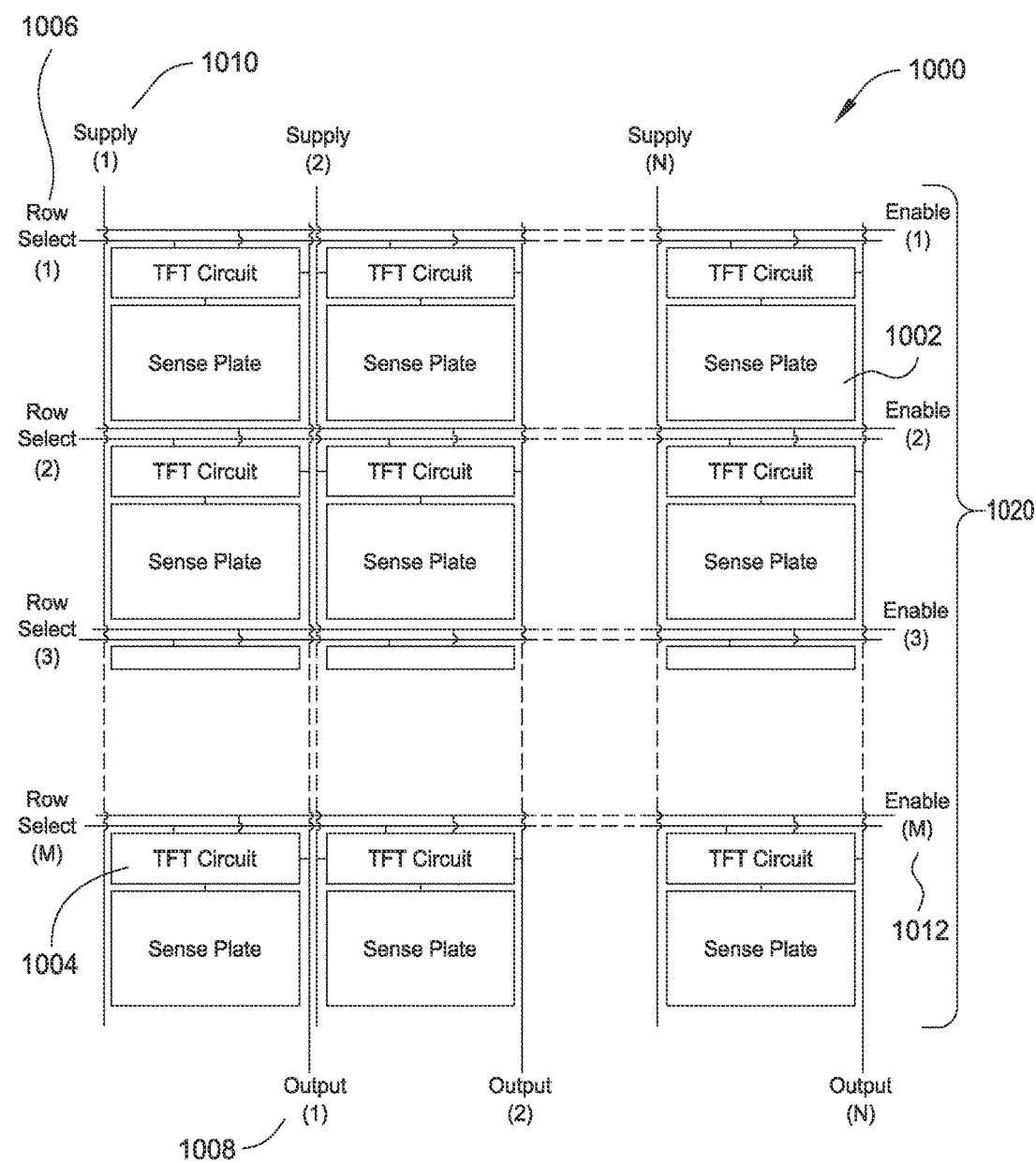
FIG. 10 illustrates a 2-TFT pixel architecture for an active matrix capacitive fingerprint sensor according to another embodiment.

Active Matrix Capacitive Fingerprint Sensor with
2-TFT Pixel Architecture for Display Integration FIG. 10 illustrates a pixel architecture for an active matrix capacitive fingerprint sensor according to one embodiment. Architecture 1000 may operate with as few as two TFTs in each sensing pixel. Architecture 1000 comprises an array 1020 of sense elements 1002 (in this example sense elements 1002 comprise sense plates 1002) each addressed through a TFT circuit 1004 controlled by a row of addressing lines (row select 1006) and a row of enable lines 1012.

Each TFT circuit 1004 is connected to a common output line 1008 and to a supply line 1010.

Figure 11:
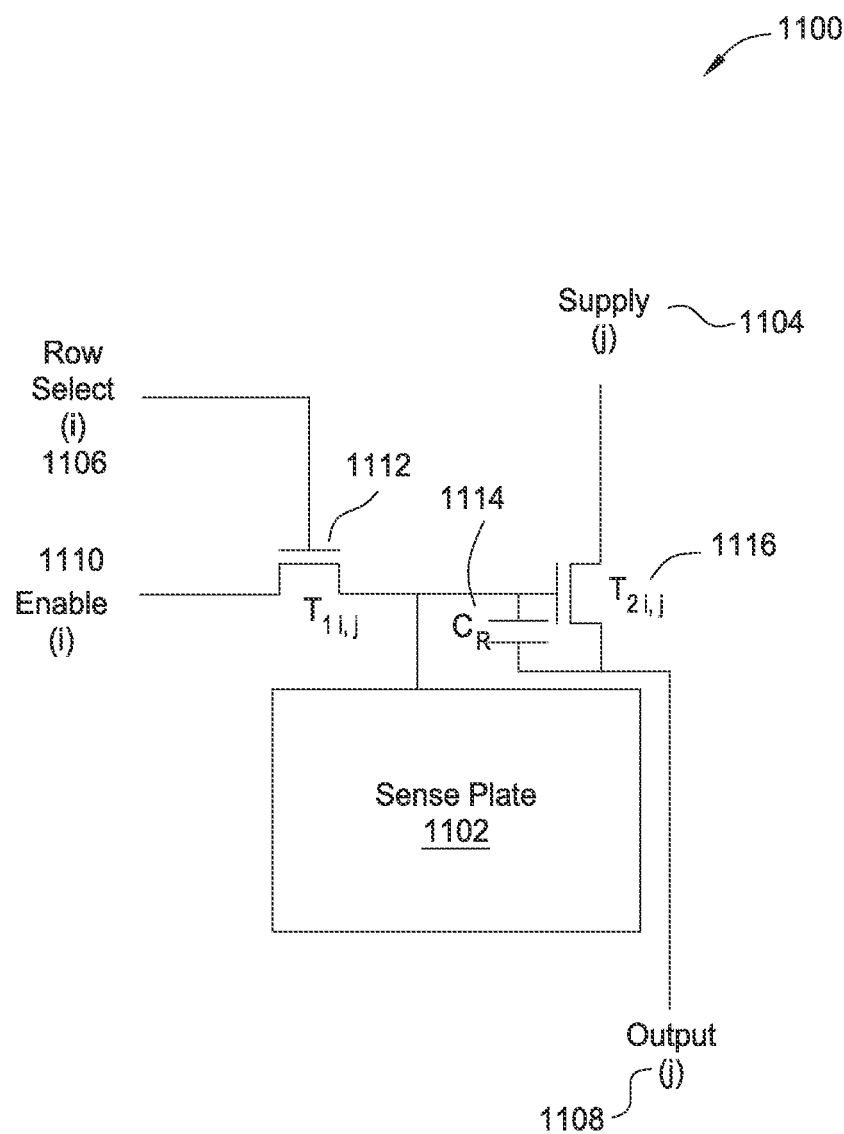
FIG. 11 illustrates a schematic for a drive/readout circuit.

FIG. 11 illustrates a schematic of pixel circuit 1100 of a column j connected to sense plate 1102 at row $1106_i$ and column $1108_j$. Each sense electrode is connected through a first TFT $T1_{i,j}$ 1112 to an enable line 1110. The first TFT 1112 $T1_{i,j}$ is controlled by a row select line 1106 coupled to a gate electrode. Each sense plate 1102 is connected to the gate of a second TFT $T_{2i,j}$ 1116 while the drain of the second TFT $T_{2i,j}$ 1116 is connected to the supply line 1104 and its source is connected to the output line 1108. The reference capacitor $C_R$ 1114 is connected between the gate and source of the second TFT 1116. Each row of pixels shares the same enable line 1110 and row select line 1106, and all pixels in the same column share the same supply line 1104 and output line 1108. In a variation of the pixel architecture discussed in further detail below, no supply line 1104 is included and the drain of the second TFT $T_{2i,j}$ 1116 is connected to the row select line 1106 (see, e.g., FIG. 17). In this sensor, the capacitance formed between the sense plate 1102 and surface of the finger controls the steady-state output current of the second TFT $T_{2i,j}$ 1116. By measuring the output current of the pixel, the capacitance between the sense plate 1102 and the finger can be determined for each pixel, thereby providing an image of the finger surface.

The architecture illustrated in FIGS. 10 and 11 provides a minimum impact on optical performance of the display, as the architecture uses 2 TFTs per pixel with small dimensions. As the steady state current of the pixel represents the value of the capacitance between the finger and the sense plate 1102 (which is determined by the shape of the finger surface), the measurement time of the output current can be increased to enhance the accuracy of the measurement.

Operation of the second TFT $T_{2i,j}$ 1116 in the sub-threshold regime is possible to benefit from an exponential current-voltage dependence (i.e., the current has an exponential dependence to the value of the finger-sense plate capacitance). To the first order, the parasitic elements do not impact the response of the sensor output as the sensor operates in steady-state mode.

The circuit can be operated in a three-stage drive/readout sequence to extract the TFT IV characteristics for accurate calculation of the finger capacitance. This method cancels the effect of process variation resulting in characteristic mismatch across the array. It is also possible to calibrate the device by scanning the array when no finger is present to cancel the effect of TFT performance variation and device mismatch across the array.

Figure 12:
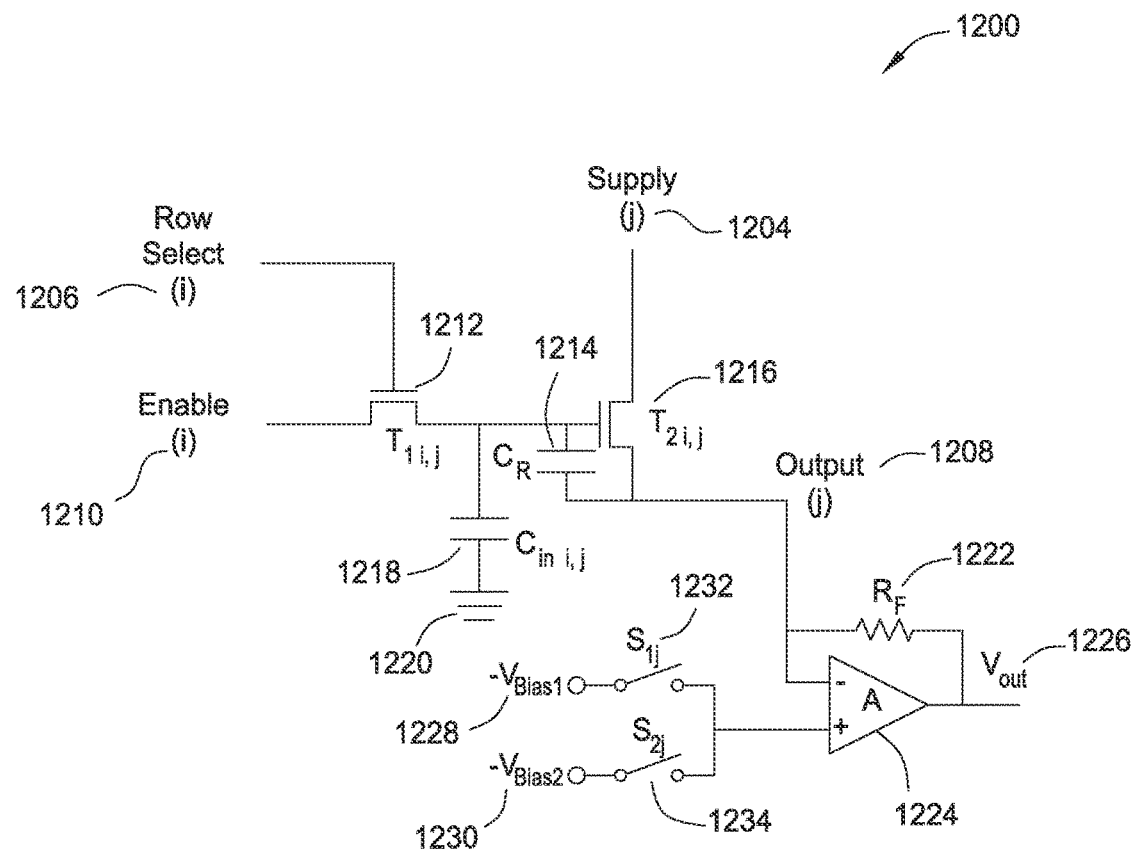
FIG. 12 illustrates a schematic for a drive/readout circuit.

FIG. 12 illustrates a schematic 1200 of a drive/readout circuit of the column j connected to the pixel at row i and column j for the structure illustrated in FIGS. 10 and 11. The readout circuit includes two switches $S_{1j}$ 1232 and $S_{2j}$ 1234, an operational amplifier 1224, and a feedback resistor $R_F$ 1222. Switch $S_{1j}$ 1232 is used to connect the output to a first bias voltage $-V_{Bias1}$ 1228, and switch $S_{2j}$ 1234 is used to connect the output to the second bias voltage $-V_{Bias2}$ 1230. Schematic 1200 further comprises TFTs 1212 and 1216 and capacitances $C_R$ 1214 and $C_{in\ i,j}$ 1218 (the input object is assumed to be coupled to ground 1220). Feedback resistor $R_F$ 1222 is coupled to amplifier 1224 and $V_{out}$ 1226. Row select line 1206, enable line 1210, supply 1204, and output 1208 are also illustrated in FIG. 12.

Figure 13:
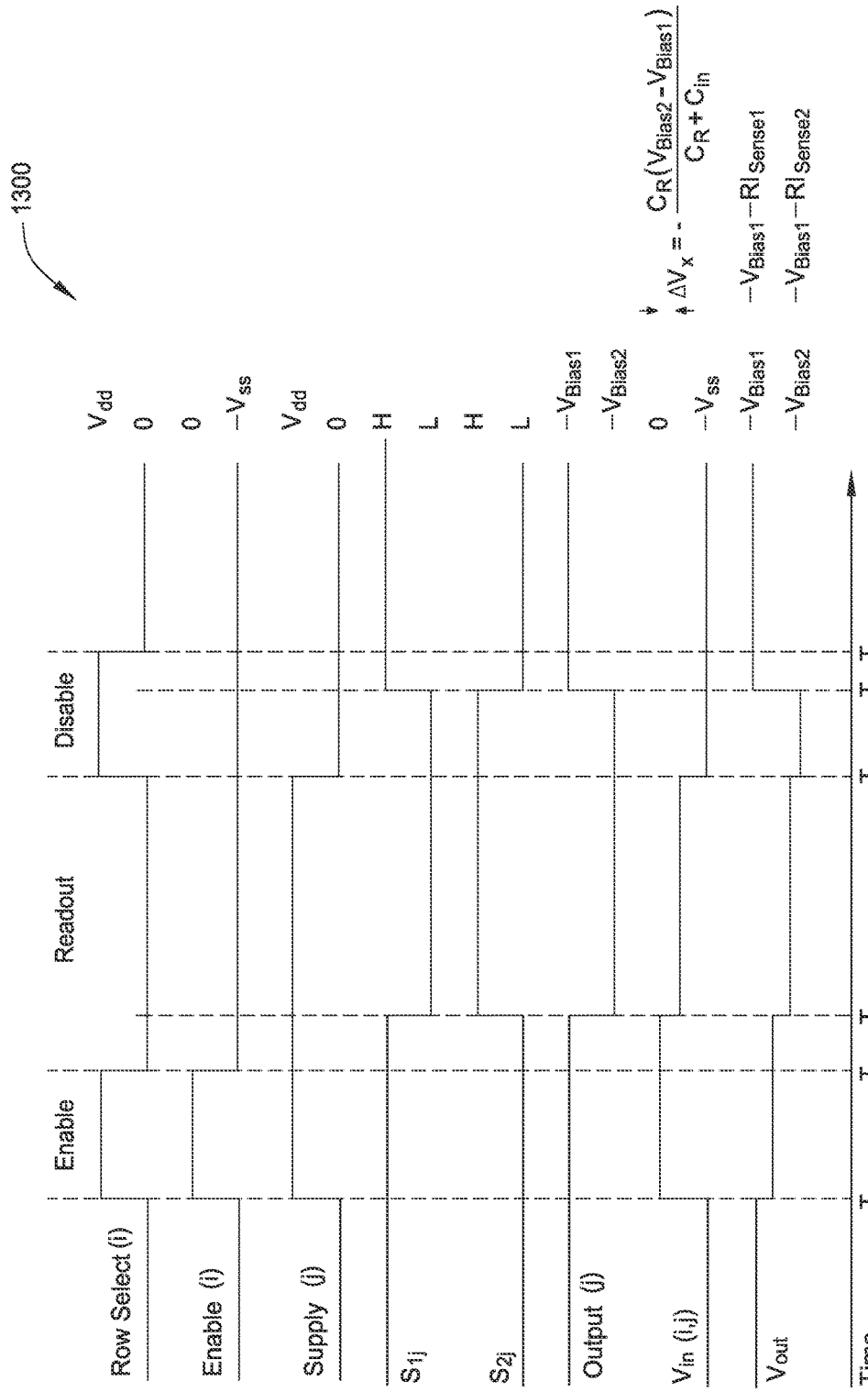
FIG. 13 illustrates a timeline that comprises signal waveforms during a drive/readout sequence.

FIG. 13 illustrates timeline 1300 that comprises signal waveforms during the drive/readout sequence in accordance with FIGS. 10, 11, and 12. A 3-step sequence is used to measure the capacitance formed between the sense plate 1102 and a finger. This capacitance contains the information related to the topography of the finger surface. The readout sequence consists of an enable step, readout step, and a disable step. To enable the pixel, at time T1, sense plate 1102 is connected to the enable line 1210 through the TFT $T_{1i,j}$ 1212; i.e., Row Select $1206_i$ is set to High and enable $1210_i$ is biased at 0 V. The Supply $1204_j$ is also set to $V_{dd}$. This will set the potential of sense plate 1102 to 0 V. During this time switch $S_{1j}$ 1228 is High (closed or connected) and switch $S_{2j}$ 1234 is Low (open or disconnected). As a result the output voltage is at $-V_{Bias1}-RI_{Sense1}$. $I_{Sense1}$ is a function of IV characteristics of $T_{2i,j}$ 1216 and $V_{Bias1}$ 1228. It is important to note that $I_{Sense1}$ is independent of the absolute or trans capacitance of the input object. During the readout step, at time T2, sense plate 1102 is isolated from enable line 1210; i.e., Row Select $1206_i$ is set to Low (0 or a negative voltage) and enable $1210_i$ is biased at $-V_{SS}$. Next, at time T3, switch $S_{1j}$ 1232 is set to Low and switch $S_{2j}$ 1234 is set to High. This connects $V_{Bias2}$ 1230 to the positive terminal of the operational amplifier 1224 and isolates $V_{Bias1}$ 1228 from the operational amplifier 1224. For an op-amp with large enough gain, the voltage of the negative terminal of the op-amp becomes $-V_{Bias2}$; hence the Output (j) 1208 is pulled down to $-V_{Bias2}$ (from $-V_{Bias1}$). As a result, the output current of the $T_{2i,j}$ 1216 changes and the $V_{out}$ will change to $-V_{Bias2}-RI_{Sense2}$, where $I_{Sense2}$ is a function of the measured capacitance (either absolute or trans capacitance) and characteristics of the TFT 1216. At time T4 (start of the Disable step), $T_{2i,j}$ 1216 is turned Off by biasing the gate of $T_{2i,j}$ 1216 at $-V_{SS}$ by setting the row select line $1206_i$ to $V_{dd}$ and the enable line $1210_i$ to $-V_{SS}$. This will set the voltage of $V_{out}$ 1226 and output line $1208_j$ to $-V_{Bias2}$. At time T5, switch $S_{1j}$ 1232 is set to High and switch $S_{2j}$ 1234 to Low, to reset the voltage of output line $1208_j$ and $V_{out}$ 1226 to $-V_{Bias1}$. Finally, at time T6, the Disable stage is finalized by setting the row select $1206_i$ to 0 V. At this point the pixel is ready for the next Enable/Readout/Disable sequence.

Figure 14A:
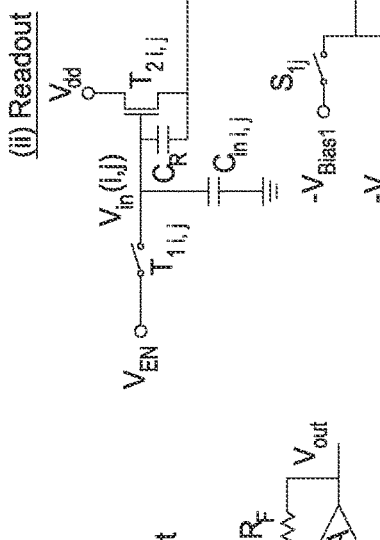
FIGS. 14A-14C illustrate equivalent circuits of a pixel (i, j) connected to a drive/readout circuit during enable, readout, and disable stages.
Figure 14B:
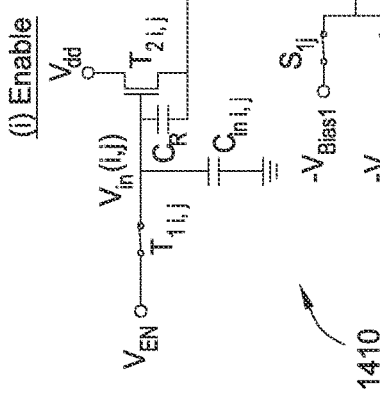
Figure 14C:
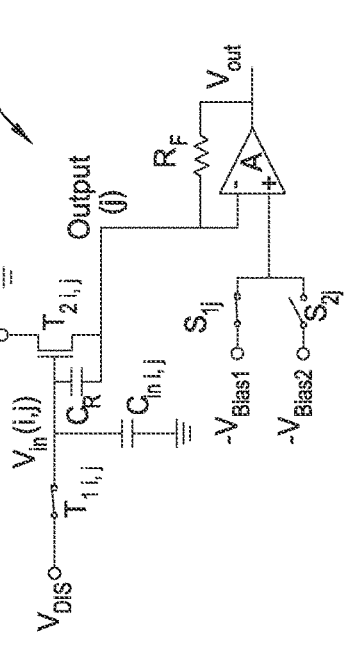

FIGS. 14A-14C illustrate equivalent circuits of a pixel (i, j) connected to the drive/readout circuit during enable, readout, and disable stages, respectively. The sense plate 1102 capacitance to the finger (absolute capacitance) is denoted by $C_{in}$ and it is assumed that the parasitic gate-source capacitance of $T2_{i,j}$ 1216 is included in $C_R$, and the rest of the parasitic elements are ignored. FIG. 14A illustrates the equivalent circuit 1410 during an enable stage (T1<t<T2 as illustrated in FIG. 13). FIG. 14B illustrates the equivalent circuit 1420 during a readout stage (T3<t<T4 as illustrated in FIG. 13). FIG. 14C illustrates the equivalent circuit 1430 during a disable stage (T5<t<T6 as illustrated in FIG. 13).

Figure 15:
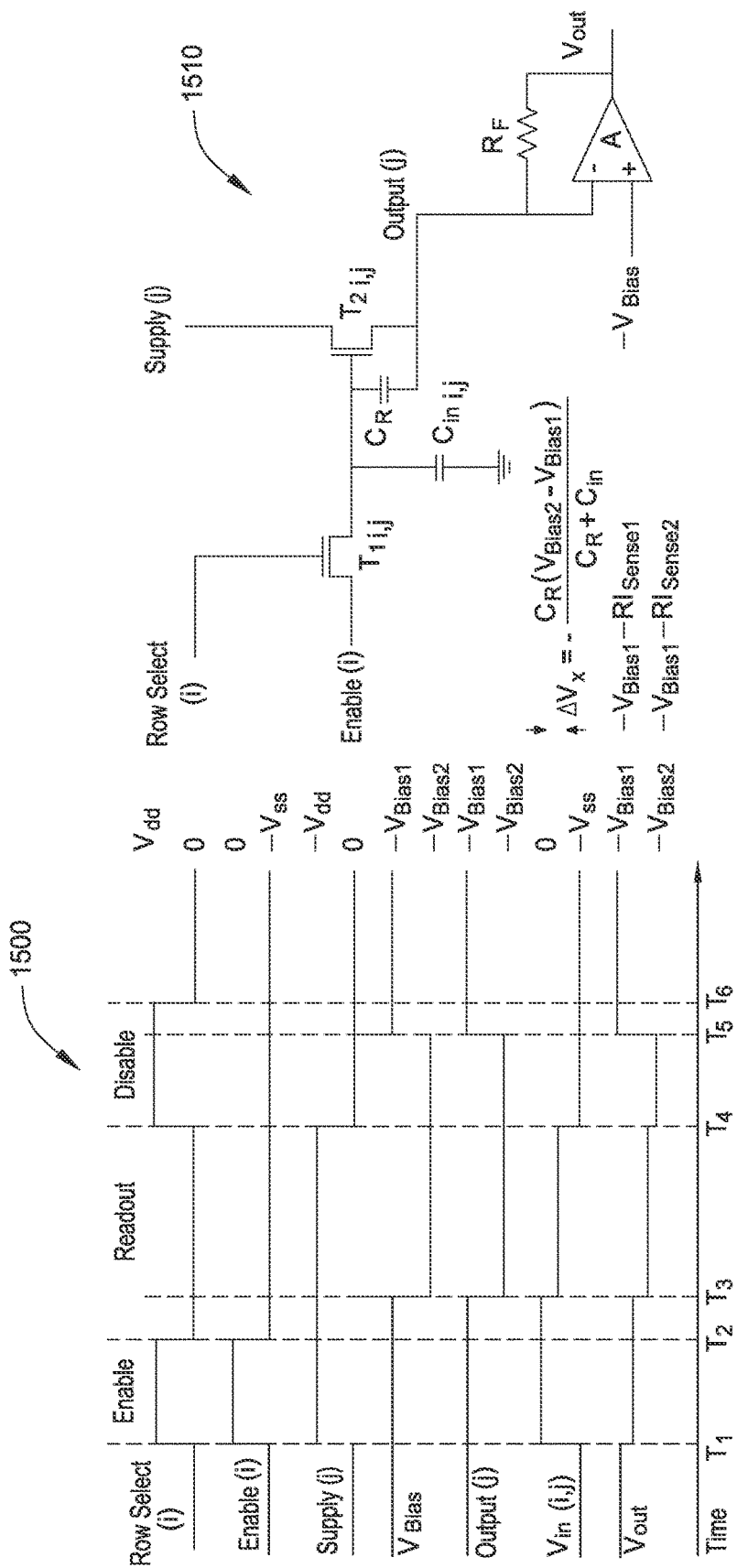
FIG. 15 illustrates signal waveforms and a drive circuit 1510 during a drive/readout sequence.

FIG. 15 illustrates signal waveforms 1500 and drive circuit 1510 during the drive/readout sequence for the pixel architecture of FIGS. 10-12 implemented without switch $S_{1j}$ and switch $S_{2j}$. As the state of switches $S_{1j}$ and $S_{2j}$ are opposite (illustrated in waveform 1500), it is possible to remove both switches and apply the proper signal directly to the positive terminal of operational amplifier 1224 as shown in FIG. 15.

Figure 16:
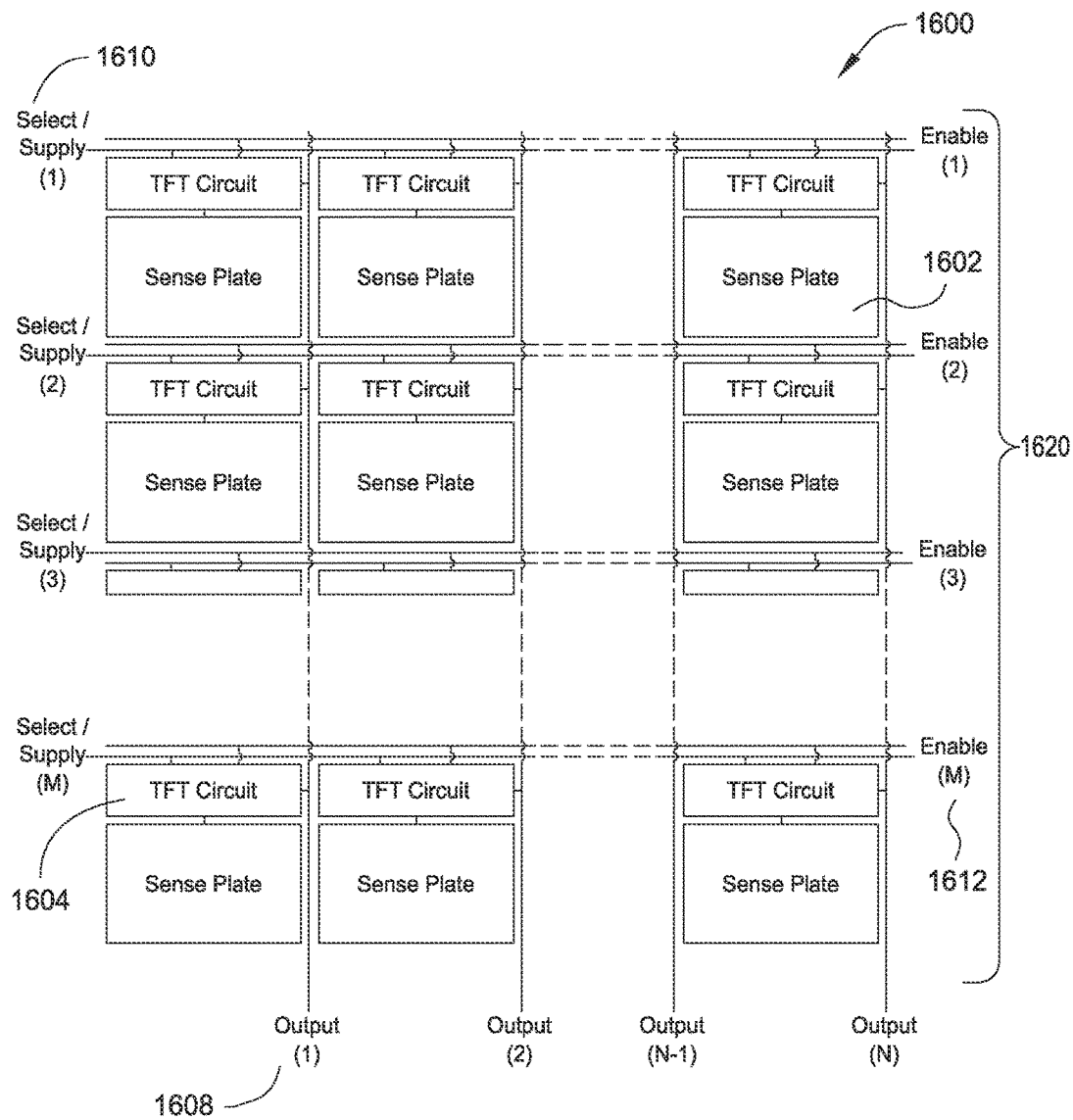
FIG. 16 illustrates a 2-TFT pixel architecture for an active matrix capacitive fingerprint sensor according to another embodiment.

FIG. 16 illustrates a 2-TFT pixel architecture for an active matrix capacitive fingerprint sensor according to another embodiment. Architecture 1600 comprises an array 1620 of sense elements (sense elements 1602 comprise sense plates 1602 in this embodiment) each addressed through a TFT circuit 1604 controlled by a row of addressing lines (row select 1610) and a row of enable lines 1612. Each TFT circuit 1604 is connected to a common output line 1608. In this architecture, no separate supply line is included and the drain of the second TFT is coupled to the row select line (compare to architecture 1000 in FIG. 10).

Figure 17:
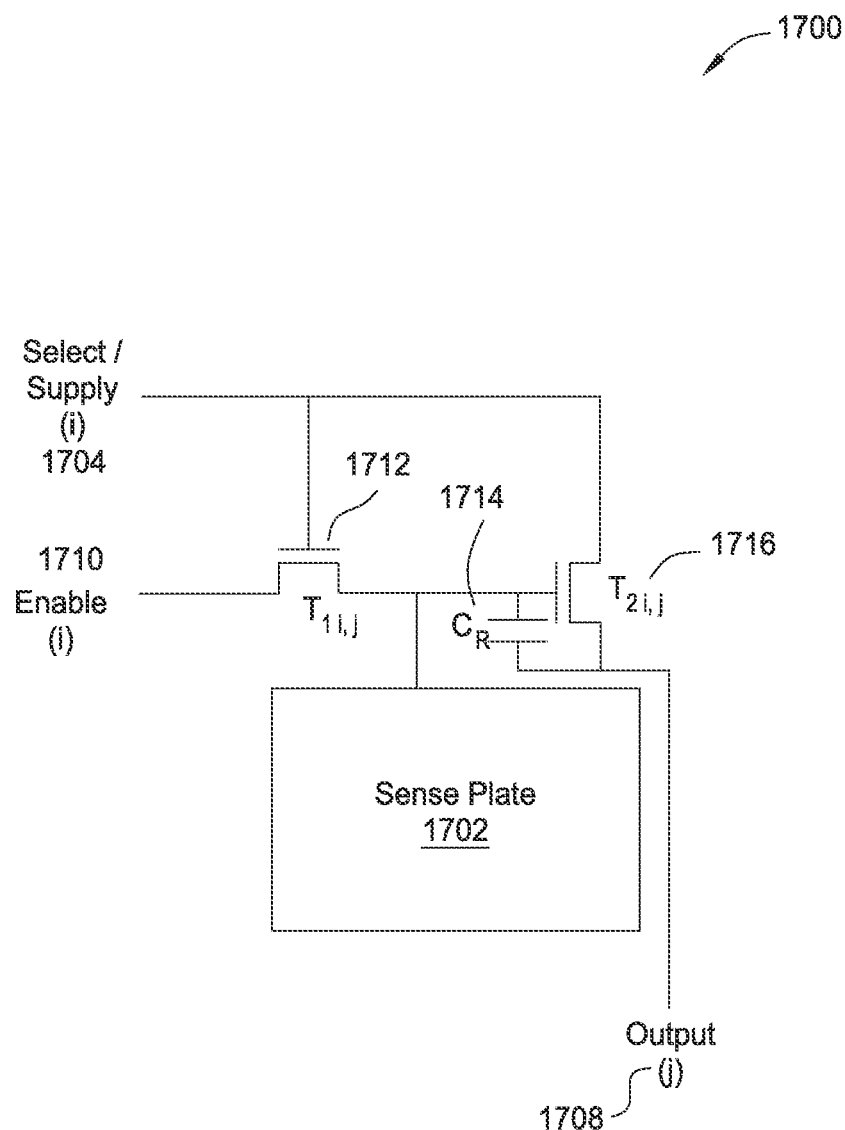
FIG. 17 illustrates a schematic for a drive/readout circuit.

FIG. 17 illustrates a schematic for a pixel circuit 1700 of a column j connected to sense plate 1702 at row i 1704. Each sense electrode is connected through a first TFT $T_{1i,j}$ 1712 to an Enable line 1710. The first TFT $T_{1i,j}$ 1712 is controlled by a row select/supply line 1704 coupled to a gate electrode of TFT $T_{1i,j}$ 1712 (no separate supply line is included in this embodiment). Each sense plate 1702 is connected to the gate of a second TFT $T_{2i,j}$ 1716 while the drain of the second TFT $T_{2i,j}$ 1716 is connected to the row select/supply line 1704 and its source is connected to the output line 1708. The reference capacitance $C_R$ 1714 is connected between the gate and source of the second TFT $T_{2i,j}$ 1716. The drain of the second TFT $T_{2i,j}$ 1716 is connected to the row select/ supply line 1704. In this schematic, the capacitance formed between the sense plate 1702 and surface of the finger controls the steady-state output current of the second TFT $T_{2i,j}$ 1716. By measuring the output current of the pixel, the capacitance between the sense plate 1702 and a finger can be determined, thereby providing an image of the finger surface.

Figure 18:
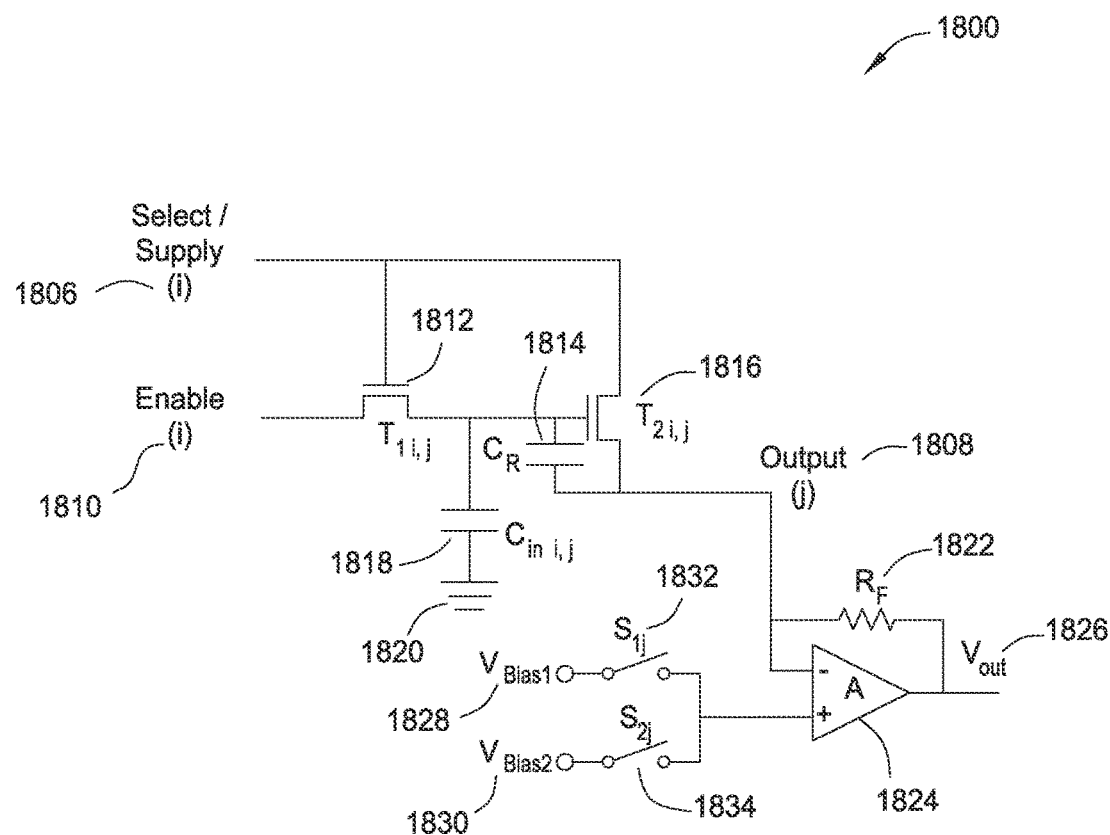
FIG. 18 illustrates a schematic for a drive/readout circuit.

FIG. 18 illustrates a schematic 1800 of a drive/readout circuit of the column j connected to the pixel at row i and column j for the structure illustrated in FIGS. 16 and 17. The readout circuit includes two switches $S_{1j}$ 1832 and $S_{2j}$ 1834, an operational amplifier 1824, and a feedback resistor $R_F$ 1822. Switch $S_{1j}$ 1832 is used to connect the output to a first bias voltage $-V_{Bias1}$ 1828, and switch $S_{2j}$ 1834 is used to connect the output to the second bias voltage $-V_{Bias2}$ 1830. Schematic 1800 further comprises TFTs 1812 and 1816 and capacitors $C_R$ 1814 and $Ci_{n\ i,j}$ 1818 (the input object is assumed to be coupled to ground 1820). Feedback resistor $R_F$ 1822 is coupled to amplifier 1824 and $V_{out}$ 1826. Row select/supply 1806, enable 1810, and output 1808 are also illustrated in FIG. 18.

Figure 19:
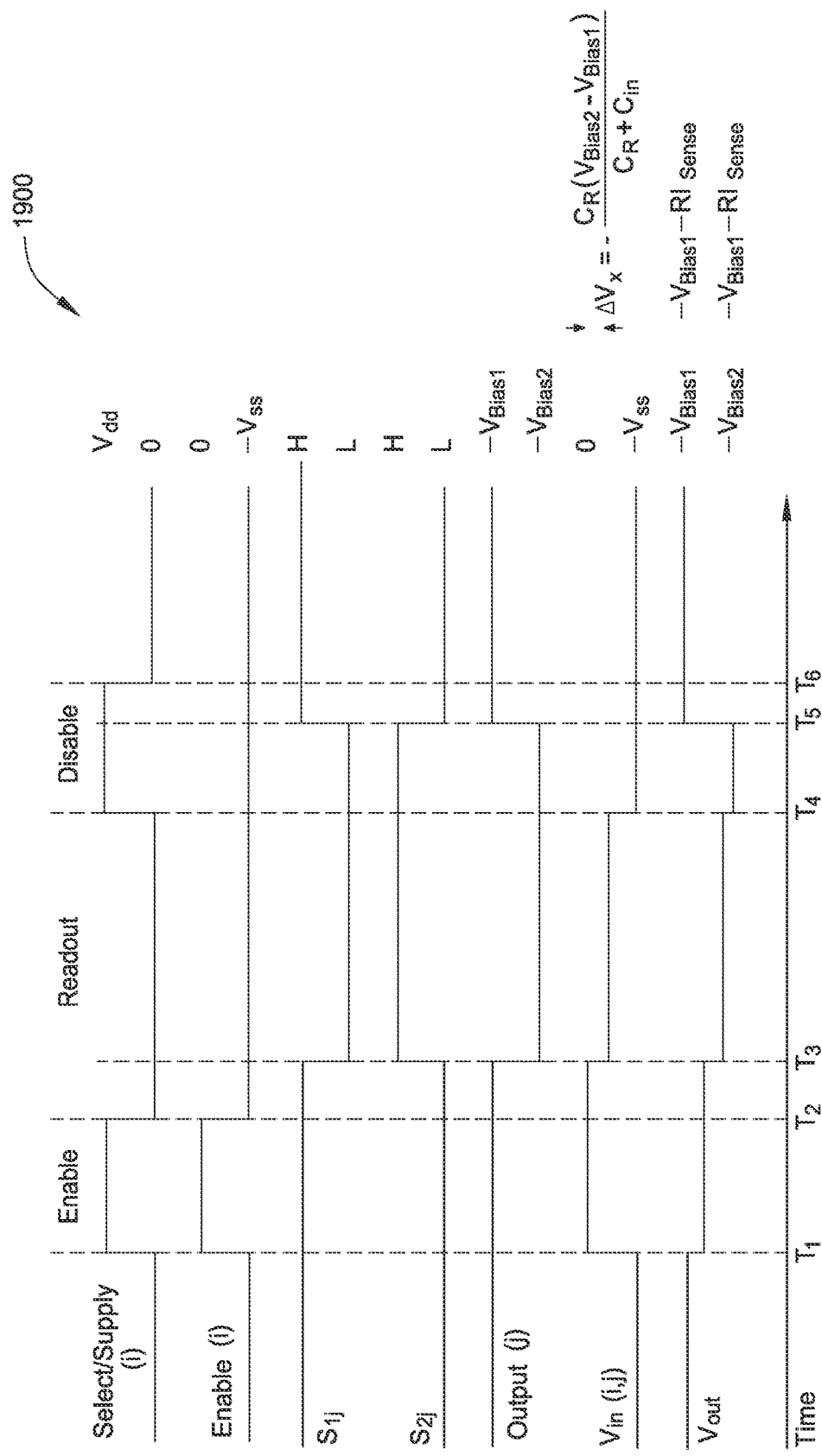
FIG. 19 illustrates a timeline that comprises signal waveforms during a drive/readout sequence.

FIG. 19 illustrates timeline 1900 that comprises signal waveforms during the drive/readout sequence in accordance with FIGS. 16, 17, and 18. A 3-step sequence is used to measure the capacitance formed between the sense plate 1702 and an input object, such as a finger. This capacitance contains the information related to the topography of the finger surface. The readout sequence consists of an enable step, readout step, and a disable step. The waveforms are similar to the waveforms discussed above with respect to FIGS. 11-13, except that there are no supply lines for FIGS. 16-18, and the select/supply lines replace the row select lines. For a detailed discussion of the operations, see FIG. 13 above.

FIGS. 20A-20C illustrate equivalent circuits of a pixel (i, j) connected to the drive/readout circuit during enable, readout, and disable stages, respectively. The capacitance between sense plate 1702 and the finger is denoted by $C_{in}$ and it is assumed that the parasitic gate-source capacitance of $T_{2i,j}$ 1816 is included in $C_R$, and the rest of the parasitic elements are ignored. FIG. 20A illustrates the equivalent circuit 2010 during an enable stage (T1<t<T2 as illustrated in FIG. 19). FIG. 20B illustrates the equivalent circuit 2020 during a readout stage (T3<t<T4 as illustrated in FIG. 19). FIG. 20C illustrates the equivalent circuit 2030 during a disable stage (T5<t<T6 as illustrated in FIG. 19).

Figure 21:
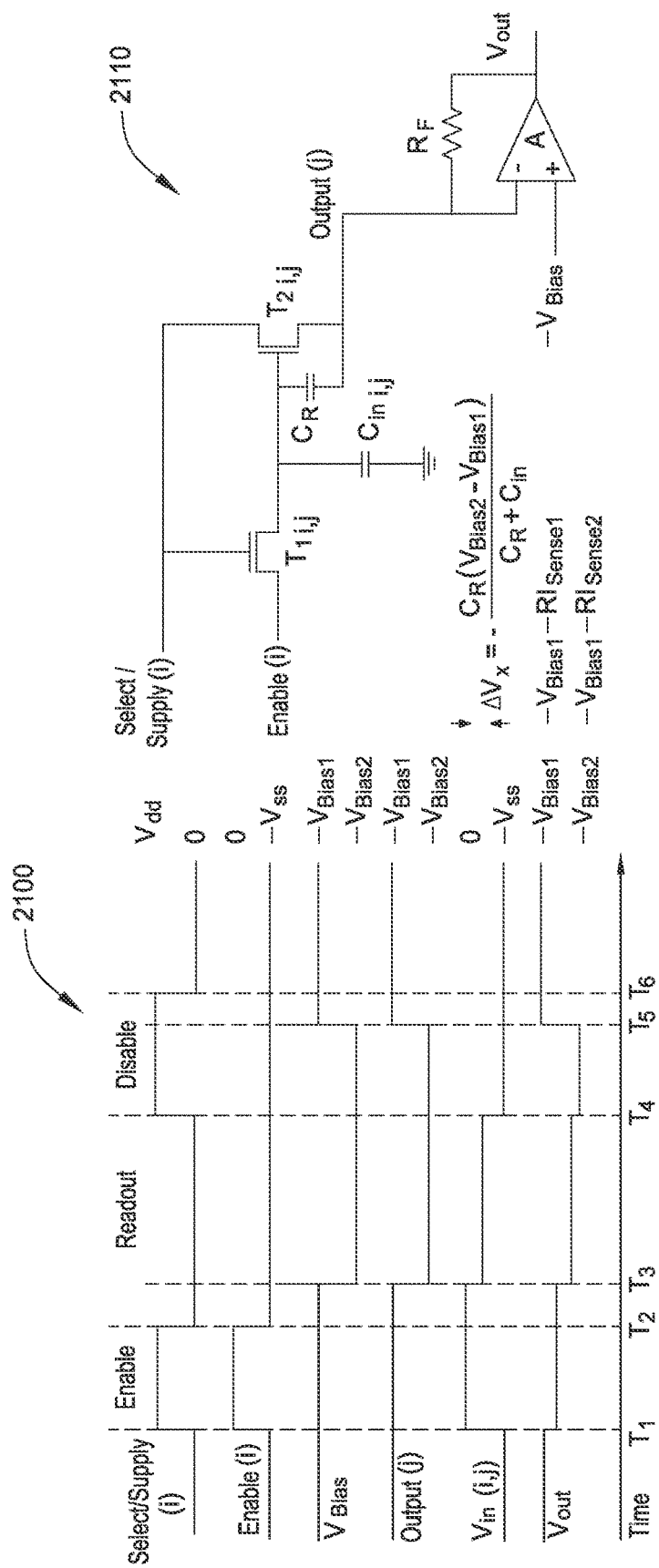
FIG. 21 illustrates signal waveforms and a drive circuit during a drive/readout sequence.

FIG. 21 illustrates signal waveforms 2100 and drive circuit 2110 during the drive/readout sequence for the pixel architecture of FIGS. 16-18 implemented without switches $S_{1j}$ and $S_{2j}$. Because the switches $S_{1j}$ and $S_{2j}$ are driven opposite one another (when one is high, the other is low), it is possible to remove both switches and apply the appropriate $V_{Bias1}$ or $V_{Bias2}$ signal directly to the positive terminal of operational amplifier 1824 as shown in FIG. 21.

With respect to both 2-TFT architectures illustrated in FIGS. 10-12 and 16-18, during the enable stage, the potential of the gate of the sense transistor ($T_{2i,j}$) is raised to 0 V. This allows for a current flow in this transistor when a negative voltage is applied to the source of this transistor. During the readout stage, the source voltage of sense transistor changes from $-V_{Bias1}$ to $-V_{Bias2}$. Initially (enable stage), the output current of the sense transistor is independent of the capacitance detected by the sense element, but at the later stage the output current will be a function of this capacitance (see equations below). Hence, in the initial stage (enable stage), the sense transistor can be characterized and the sense capacitor can be accurately determined in the second stage. This will eliminate the effect of process variation and device mismatch across the array. During the Disable stage, a $-V_{SS}$ potential is applied to the gate of the sense transistor to ensure that the TFT remains in the off state when the rest of the pixels in the same column are addressed. The following provides the equations for sense current and output voltage during the readout of a pixel. It is assumed that the circuit has reached steady state condition. The current of the TFT is a function of $V_{DS}$ and $V_{GS}$ expressed as $f(V_{GS2}, V_{DS2})$.

Equations for the fingerprint sensor of FIGS. 10-12:
At $T_3^-$ (just before changing the state of $S_{1j}$ and $S_{2j}$):

$V_{GS2}=0-(-V_{Bias1})=V_{Bias1}$ $V_{DS2}=V_{dd}-(-V_{Bias1})=V_{dd}+V_{Bias1}$ $I_{Sense1}=f(V_{Bias1},V_{dd}+V_{Bias1})$ $V_{out}=-V_{Bias1}-RI_{Sense1}$ At $T_4^-$ (just before changing the state of row select (i)):

$$V_{GS2} = -\frac{C_R(V_{Bias2}-V_{Bias1})}{C_R+C_{in}}-(-V_{Bias2}) = \frac{C_{in}V_{Bias2}+C_RV_{Bias1}}{C_R+C_{in}}$$

$$V_{DS2} = V_{dd}-(-V_{Bias2}) = V_{dd}+V_{Bias2}$$

$$I_{Sense1} = f\left(\frac{C_{in}V_{Bias2}+C_RV_{Bias1}}{C_R+C_{in}}, V_{dd}+V_{Bias2}\right)$$

$$V_{out} = -V_{Bias2}-RI_{Sense2}$$

Equations for the fingerprint sensor of FIGS. 16-18:
At $T_3^-$ (just before changing the state of $S_{1j}$ and $S_{2j}$)

$V_{GS2}=0-(-V_{Bias1})=V_{Bias1}$ $V_{DS2}=0-(-V_{Bias1})=V_{Bias1}$ $I_{Sense1}=f(V_{Bias1},V_{Bias1})$ $V_{out}=-V_{Bias1}-RI_{Sense1}$ At $T_4^-$ (just before changing the state of Row Select (i))

$$V_{GS2} = -\frac{C_R(V_{Bias2}-V_{Bias1})}{C_R|C_{in}}-(-V_{Bias2}) = \frac{C_{in}V_{Bias2}+C_RV_{Bias1}}{C_R|C_{in}}$$

$$V_{DS2} = 0-(-V_{Bias2}) = V_{Bias2}$$

$$I_{Sense1} = f\left(\frac{C_{in}V_{Bias2}+C_RV_{Bias1}}{C_R+C_{in}}, V_{Bias2}\right)$$

$$V_{out} = -V_{Bias2}-RI_{Sense2}$$

Assuming the TFT operates in subthreshold regime with $I \propto e^{KV_{GS}}$ dependence:

$$I_{Sense1} = A \exp\left(\frac{BC_{in} + DC_R}{C_R + C_{in}}\right),$$

where A, B, and D are constants and a function of TFT characteristics, $V_{Bias1}$, and $V_{Bias2}$. The current therefore has an exponential relationship to the input capacitance, and a small change in the input capacitance can produce a large variation in sense current.

Although in the 2-TFT example architectures above, the $-V_{Bias1} > -V_{Bias2}$, it is possible to run the embodiments in the condition where $-V_{Bias2} > -V_{Bias1}$. Also, the reference capacitance $C_R$ may be implemented via an additional reference capacitor connected to the two terminals of the second TFT $T_{2i,j}$ transistor, or the gate to source capacitance of the second TFT may be sufficient.

In the 2-TFT example architectures above, it is possible to read the output current only once by applying a voltage pulse to the positive terminal. A calibration step can be applied occasionally to determine the IV characteristics of the sense TFTs across the array. These parameters can be stored and used to avoid measuring the current two times in the same frame. Under this condition, the $V_{Bias}$ signal (see FIG. 15 and FIG. 21) changes from 0 to $-V_{Bias}$ and the current is only measured at $T_4^-$.

Figure 22:
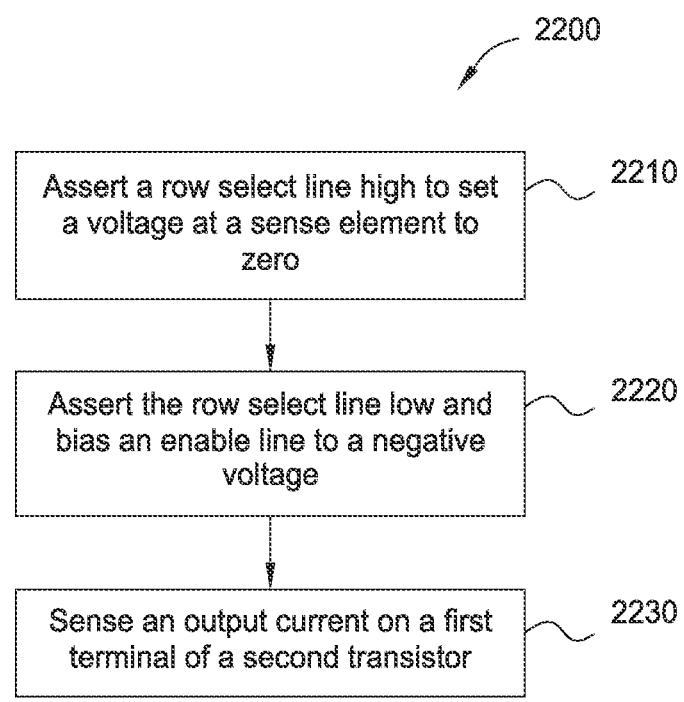
FIG. 22 is a flowchart illustrating a method for operating an input device according to one embodiment.

FIG. 22 is a flowchart illustrating a method 2200 for operating an input device, according to one embodiment. The steps of method 2200 may be performed in any suitable order. Method 2200 describes an enable/readout/disable sequence for a fingerprint sensor with a 2-TFT pixel architecture. The method begins at step 2210, where a driver module asserts a row select line high to set a voltage at a sense element to zero. The row select line is coupled to a gate terminal of a first transistor, and a second terminal of the first transistor is coupled to the sense element. A third terminal of the first transistor is coupled to an enable line.

At step 2220, the driver module asserts the row select line low and the enable line is biased to a negative voltage. This step isolates the sense element from the enable line. At step 2230, an output current is sensed on a second terminal of a second transistor. third terminal of the second transistor may be coupled to a supply line, or to a combined select/supply line in some embodiments. The output current is proportional to a feature of the input object. For example, the output current may be proportional to a capacitance between the input object (such as a finger) and the sense element. The output current can therefore be used to determine an image of a fingerprint pattern, which may be all or a portion of a complete fingerprint of a user.

Figure 23:
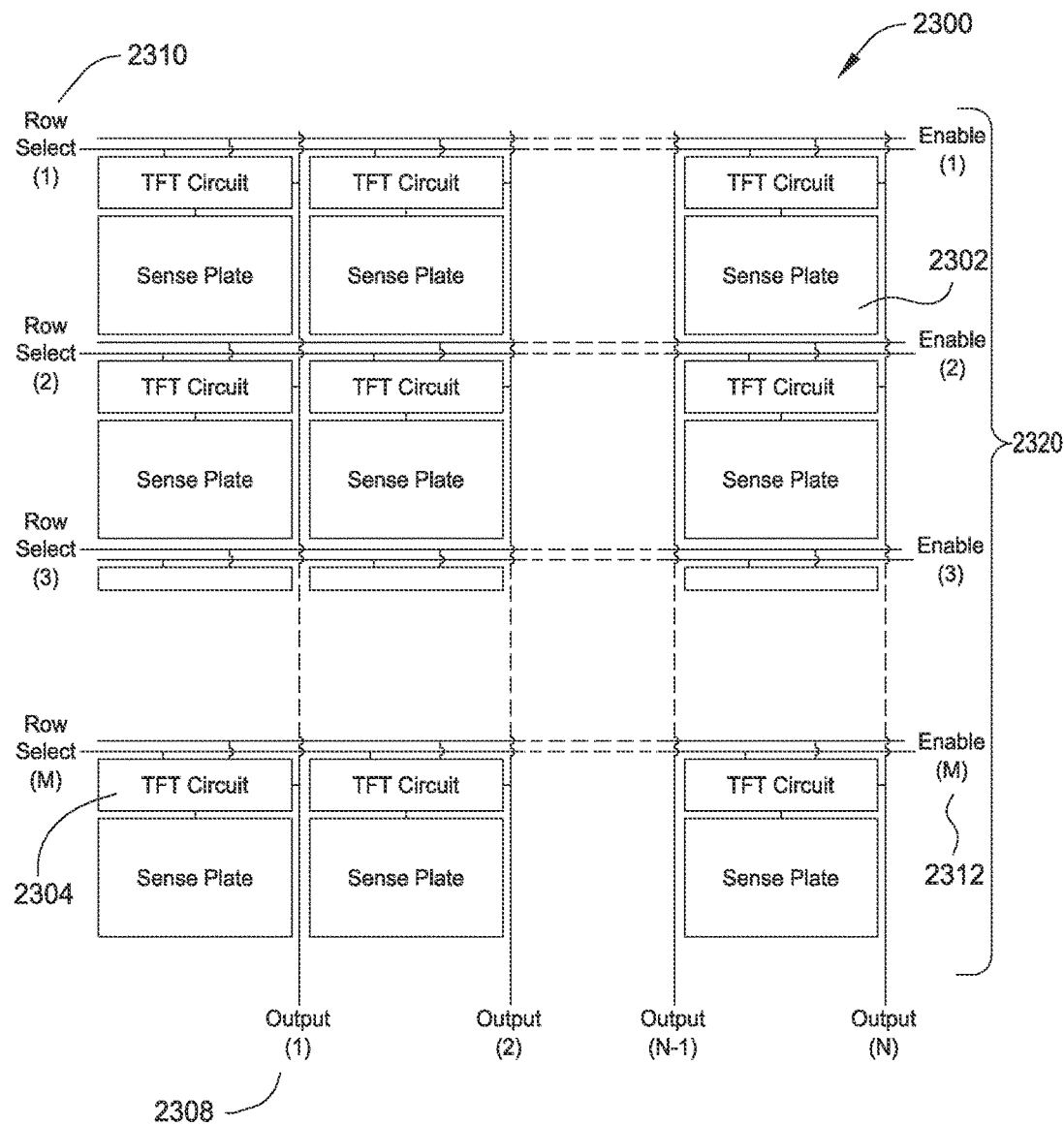
FIG. 23 illustrates a 2-TFT pixel architecture for an active matrix capacitive fingerprint sensor for display integration based on charge sensing according to another embodiment.

Active Matrix Capacitive Fingerprint Sensor for Display Integration based on Charge Sensing by a 2-TFT Pixel Architecture FIG. 23 illustrates a pixel architecture for an active matrix capacitive fingerprint sensor for display integration based on charge sensing according to one embodiment. Architecture 2300 may operate with as few as two TFTs, or one TFT and one diode in each sensing pixel. Architecture 2300 comprises an array 2320 of sense elements (sense elements 2302 comprise sense plates 2302 in this embodiment) each addressed through a TFT circuit 2304 controlled by a row of addressing lines (row select 2310) and a row of enable lines 2312. Each TFT circuit 2304 is connected to a common output line 2308.

Figure 24:
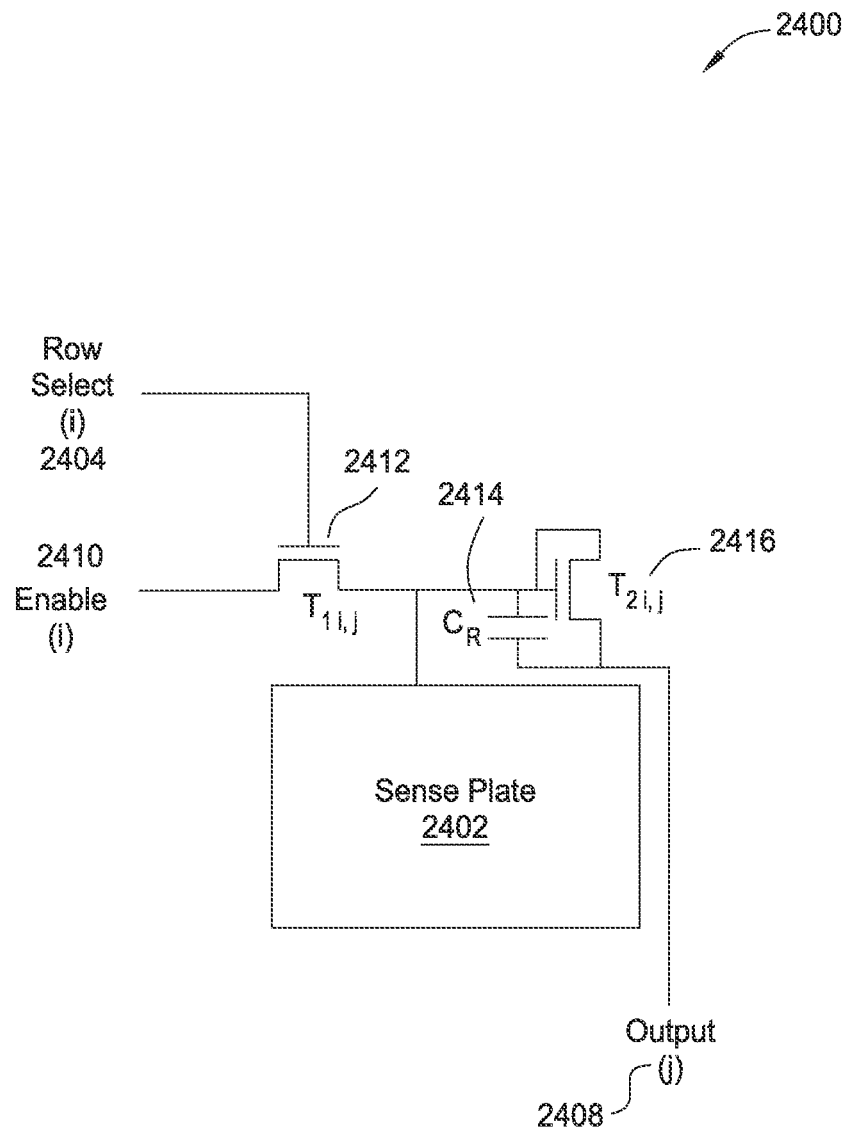
FIG. 24 illustrates a schematic for a drive/readout circuit.

FIG. 24 illustrates a schematic of a pixel 2400 of a column j connected to sense plate 2402 at row $2404_i$ and column $2408_j$. Reference capacitor $C_R$ 2414 may employed in some embodiments. Each sense plate 2402 is connected through the first TFT $T_{1i,j}$ 2412 to an enable line 2410 and the first TFT $T_{1i,j}$ 2412 is controlled by a row select line 2404. Each sense plate 2402 is connected to the gate and drain of a second TFT $T_{2i,j}$ 2416 while the source of TFT $T_{2i,j}$ 2416 is connected to the output line 2408 (the second TFT is diode-connected to create a two terminal device). The reference capacitor $C_R$ 2414 (if used) is connected between the gate and source of the second TFT $T_{2i,j}$ 2416. Each row of pixels share the same enable line 2410 and row select line 2404, and all pixels in the same column share the same output line 2408. In a variation of the pixel architecture discussed in further detail below, the second TFT $T_{2i,j}$ 2416 is replaced by a diode or other non-linear circuit element (see FIGS. 28-30). In this architecture, the charge stored on the sense plate 2402 is measured to determine the capacitance between the sense plate 2402 and the finger, hence providing an image of the finger surface.

The architecture illustrated in FIGS. 23 and 24 provides a minimum impact on optical performance of the display as the sensor may use as few as two TFTs (or one diode and one TFT) per pixel with smallest possible dimensions. Parasitic capacitance of the output line may be effectively cancelled and produces no artifact on the measured charge as the voltage of the output line remains constant during the enable and readout stages.

The steady state current flowing through the sense transistor (second TFT $T_{2i,j}$ 2416) can be used to measure the IV characteristics of the device to cancel the effect of TFT characteristics mismatch across the array. Finally, it is possible to calibrate the device by scanning the array when no finger is present to cancel the effect of TFT performance variation and device mismatch across the array.

Figure 25:
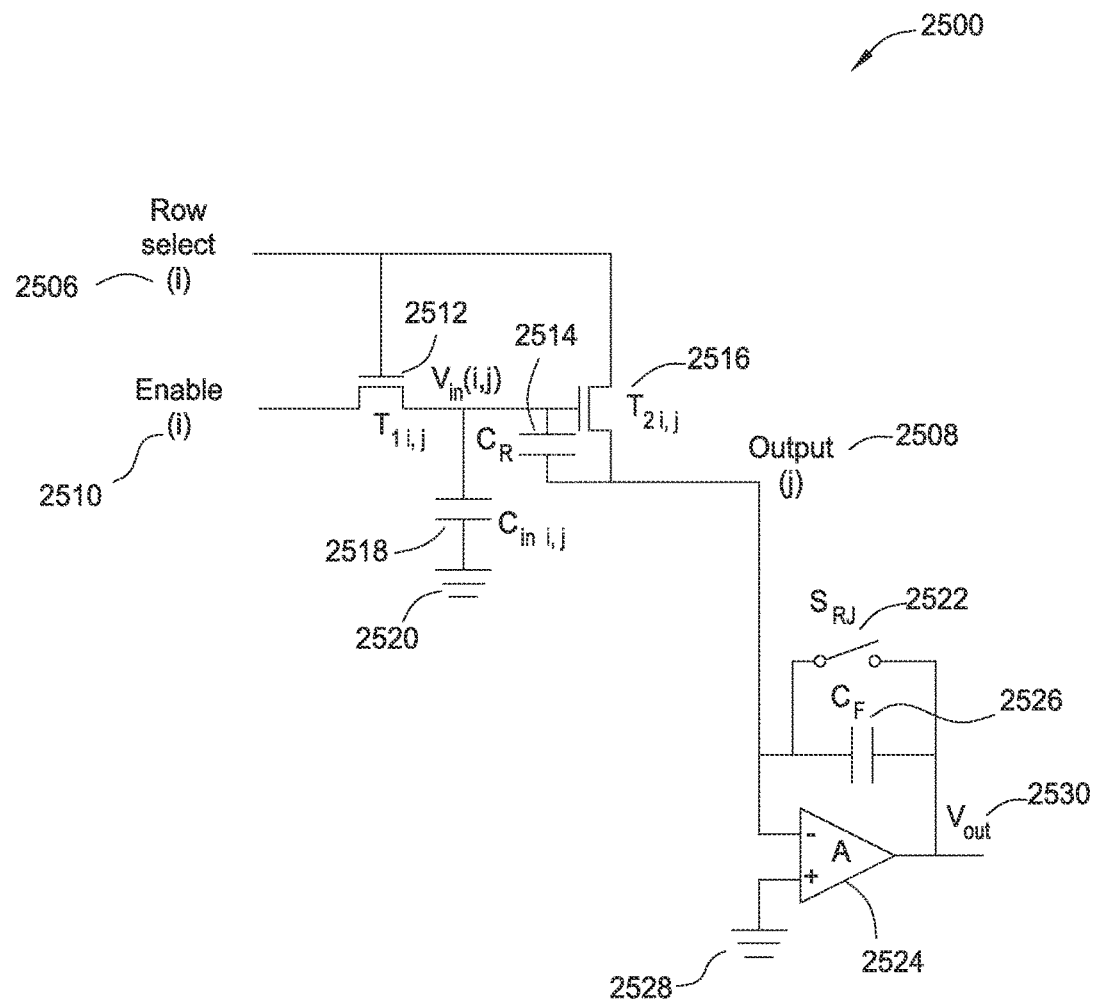
FIG. 25 illustrates a schematic for a drive/readout circuit.

FIG. 25 illustrates a schematic 2500 of a drive/readout circuit of the column j connected to the pixel at row i and column j for the pixel structure illustrated in FIG. 23. The readout circuit includes a switch $S_{Rj}$ 2522, an operational amplifier 2524, and a feedback capacitor $C_F$ 2526. Switch $S_{Rj}$ 2522 is used to reset the charge stored on feedback capacitor $C_F$ 2526 between consecutive readouts. Schematic 2500 further comprises TFTs $T_{1i,j}$ 2512 and $T_{2i,j}$ 2516 and capacitances $C_R$ 2514 and $C_{in\ i,j}$ 2518 (input capacitance, coupled to ground 2520). Feedback capacitor $C_F$ 2526 and switch $S_{Rj}$ 2522 are coupled to operational amplifier 2524 and $V_{out}$ 2530. Row select 2506, enable 2510, and output 2508 are also illustrated in FIG. 25.

Figure 26:
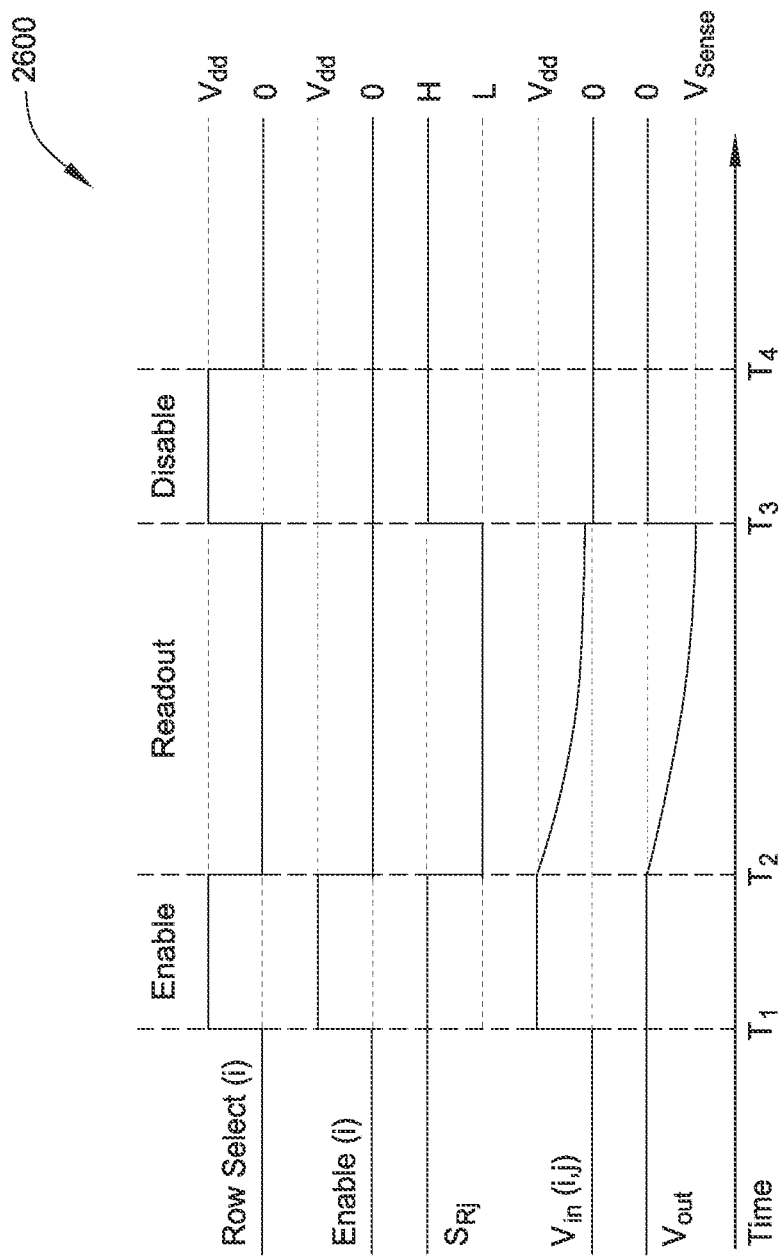
FIG. 26 illustrates a timeline that comprises signal waveforms during a drive/readout sequence.

FIG. 26 illustrates timeline 2600 that comprises signal waveforms during the drive/readout sequence in accordance with FIGS. 23, 24, and 25. A 3-step sequence is used to determine the capacitance formed between the sense plate 2402 and a finger by measuring the charge stored on sense plate 2402 due to this capacitance. This capacitance represents the information related to the topography of the finger surface. FIG. 26 shows the waveforms of the lines for pixels of 24 and 25. The readout sequence consists of an Enable step, Readout step, and a Disable step. To enable the pixel, at time $T_1$, the sense plate 2402 is connected to the enable line $2510_i$ through the TFT $T_{1i,j}$ 2512; i.e., row select $2506_i$ is set to High and enable $2510_i$ is biased at $V_{dd}$. During this time, switch $S_{Rj}$ 2522 is closed (switch $S_{Rj}$ is High) so $V_{out}$ is held at ground as the positive terminal of the operational amplifier 2524 is grounded at 2528 and the output is connected to the negative terminal. In this step, the current following through the TFT $T_{2i,j}$ 2516 is only a function of the TFT characteristics, and may be measured for calibration purposes.

At time $T_2$, Row Select 2506$_i$ and Enable 2510$_i$ lines are connected to ground and switch $S_{Rj}$ 2522 is opened (switch $S_{Rj}$ 2522 is turned Low). This step isolates the sense plate 2402 from the Enable line 2510$_i$ and transfers the charge stored on the sense plate 2402 (shown as $C_{in\ i,j}$ 2518) into feedback capacitor $C_F$ 2526. Consequently, $V_{in\ i,j}$ drops to a value below the threshold voltage of TFT $T_{2i,j}$ 2516, and $V_{out}$ drops to a negative value depending on the stored charge according to the equations presented below.

At time $T_3$, row select 2506$_i$ is connected to $V_{dd}$ to turn on TFT $T_{1i,j}$ 2516, and switch $S_{Rj}$ 2522 is closed (switch $S_{Rj}$ 2522 turns High). Hence, the pixel is disabled by setting the voltage of $V_{in\ i,j}$ to 0 V to eliminate the charge leakage through TFT $T_{2i,j}$ 2516 during the readout of the pixels in other rows. The $V_{out}$ is also set to 0 V by discharging the feedback capacitor $C_F$ 2526.

At time $T_4$, row select line 2506$_i$ is set to 0 V to prepare the pixel for another Enable/Readout/Disable sequence. To increase the speed of sensing an input capacitance, it is possible to combine the enable step of the row (i+1) with the disable step of the row (i).

Figures 27A, 27B:
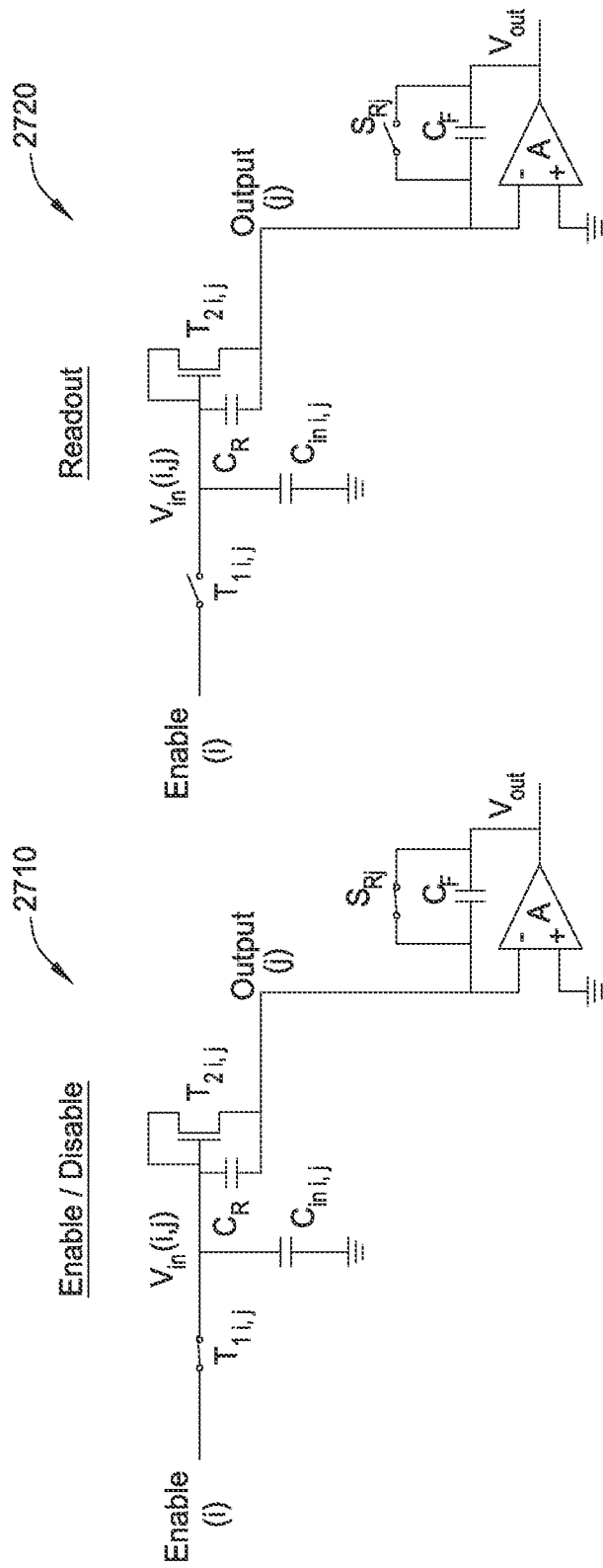
FIGS. 27A and 27B illustrate equivalent circuits of a pixel (i, j) connected to a drive/readout circuit during enable, readout, and disable stages.

FIGS. 27A and 27B illustrate equivalent circuits of a pixel (i, j) connected to the drive/readout circuit during enable, readout, and disable stages. The capacitance between sense plate 2402 and a finger is denoted as $C_{in\ i,j}$ and it is assumed that the parasitic gate-source capacitance of the TFT $T_{2i,j}$ 2516 is included in $C_R$, and the rest of the parasitic elements are ignored. FIG. 27A illustrates the equivalent circuit 2710 during the enable or disable stage (T1<t<T2 and T3<t<T4 as illustrated in FIG. 26). FIG. 27B illustrates the equivalent circuit 2720 during a readout stage (T2<t<T3 as illustrated in FIG. 26).

Figure 28:
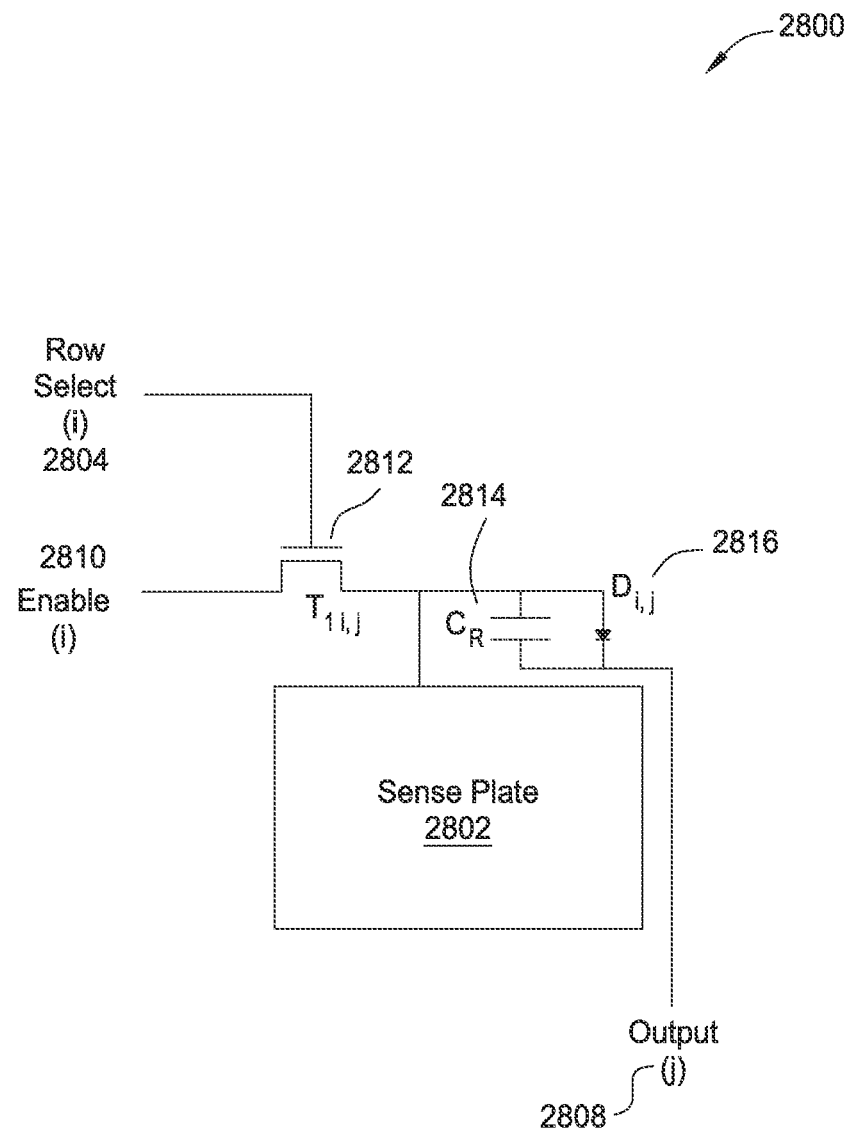
FIG. 28 illustrates a schematic for a drive/readout circuit.

FIG. 28 illustrates a schematic for a drive/readout circuit 2800 of a column j connected to sense plate 2802 at row 2804$_i$ and column 2808. Drive/readout circuit 2800 is identical to circuit 2400 illustrated in FIG. 24 with the exception of the non-linear circuit element (rectifying element) comprising the second TFT $T_{2i,j}$ 2416 being replaced by a non-linear circuit element (rectifying element) comprising a diode $D_{i,j}$ 2816. The structure and operation of the circuits are similar. In FIGS. 24 and 28, like numerals denote like elements (i.e., sense plate 2402 is equivalent to sense plate 2802, etc.). The operation and advantages described above with respect to FIGS. 23-27 also apply to FIGS. 28-30.

Figure 29:
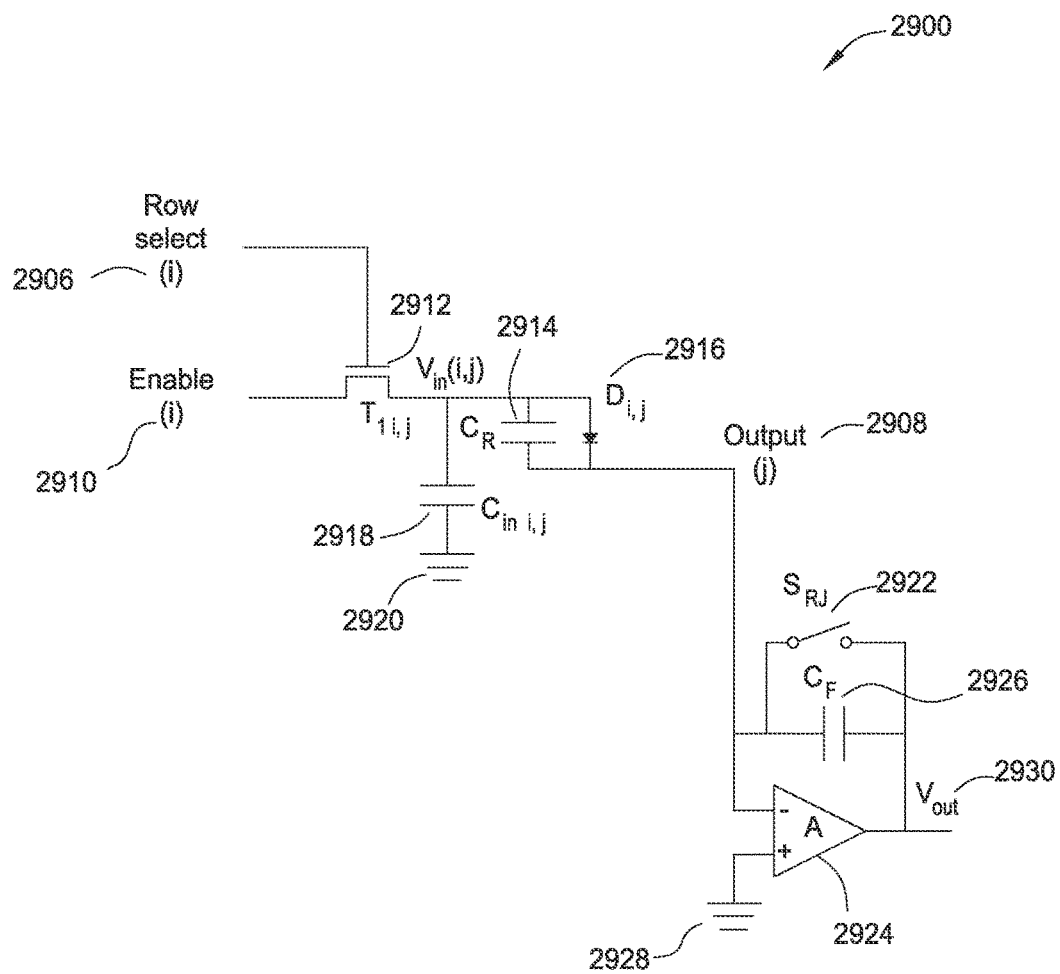
FIG. 29 illustrates a schematic for a drive/readout circuit.

FIG. 29 illustrates a schematic 2900 of a drive/readout circuit of the column j connected to the pixel at row i and column j for the pixel structure illustrated in FIG. 28. Schematic 2900 is identical to schematic 2500 illustrated in FIG. 25 with the exception of TFT 2516 being replaced by diode 2916. The structure and operation of the circuits are similar. In FIGS. 25 and 29, like numerals denote like elements (i.e., $C_F$ 2526 is equivalent to $C_F$ 2926, etc.).

Figures 30A, 30B:
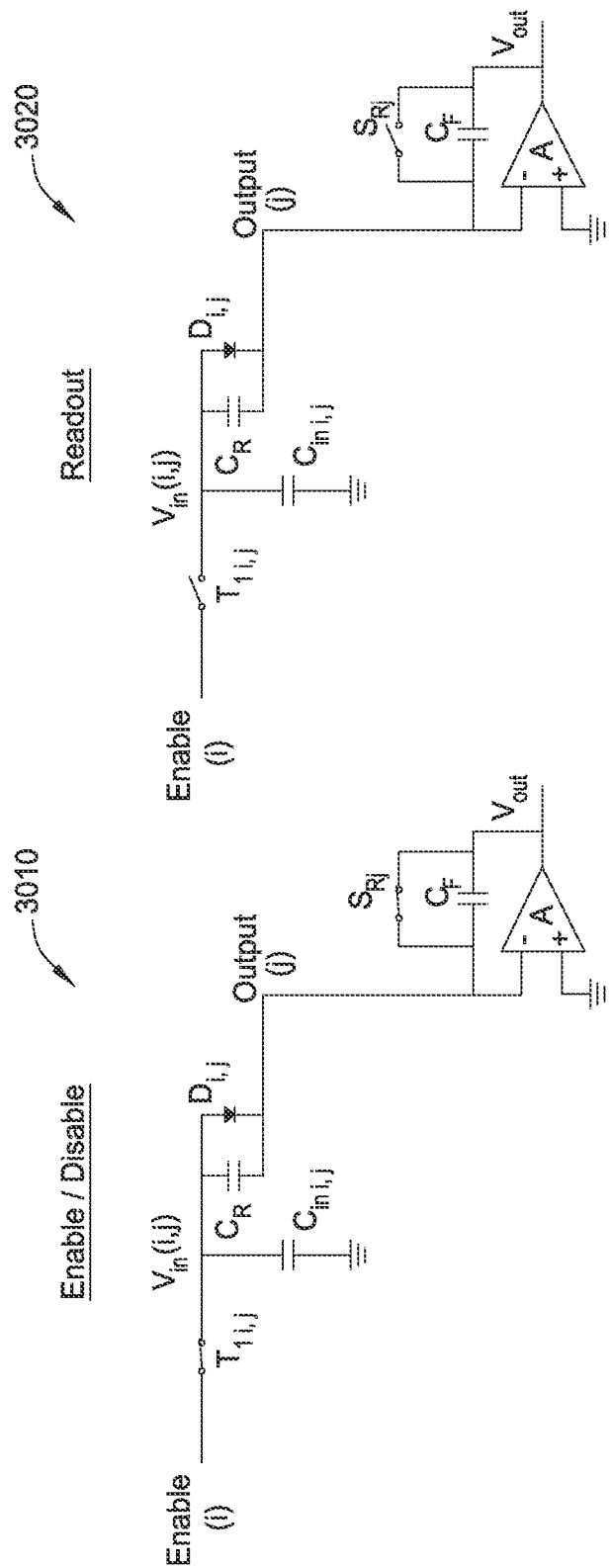
FIGS. 30A and 30B illustrate equivalent circuits of a pixel (i, j) connected to a drive/readout circuit during enable, readout, and disable stages.

FIGS. 30A and 30B illustrate equivalent circuits of a pixel (i, j) connected to the drive/readout circuit during enable, readout, and disable stages. Equivalent circuit 3010 is identical to equivalent circuit 2710 illustrated in FIG. 27 with the exception of TFT $T_{2i,j}$ being replaced by diode $D_{i,j}$. The structure and operation of the circuits are similar.

With respect to both the 2-transistor structure of FIGS. 24-27 and the transistor-plus-diode structure of FIGS. 28-30, during the enable stage, the potential of the gate of the sense transistor ($T_{2i,j}$) or the anode terminal of the diode ($D_{i,j}$) (i.e., the non-linear circuit element) is raised to $V_{dd}$. This acts to store a charge on the sense plate proportional to a measured capacitance (either absolute capacitance or trans capacitance). A constant current also follows through the transistor or diode (i.e., the non-linear circuit element), which is only a function of the IV characteristics of the device and can be measured to calibrate the sensor to cancel the effect of device mismatch across the pixel array. During the readout, the sense plate is isolated from the enable line and the charge stored on the sense plate is transferred to $C_F$. As the output current remains constant, no measured to calibrate the sensor to cancel the effect of device mismatch across the pixel array. During the readout, the sense plate is isolated from the enable line and the charge stored on the sense plate is transferred to $C_F$. As the output current remains constant, no charge is transferred to the output line parasitic capacitance. This will eliminate the effect of the parasitic elements of the output line. During the Disable stage, the sense TFT or diode is turned off by setting the voltage of the sense plate to 0 V. Hence, the pixel remains in the off state when the rest of the pixels in the same column are addressed. The following provide the equations for $V_{out}$ during the readout of the pixel. It is assumed that the diode or TFT stops conducting at $V_T$ or $V_{ON}$.

During Enable and Disable steps:

$V_{out} = 0$ V

At $T_3^-$ (just before changing the state of row select (i)):

$$V_{out} = -\frac{(C_{in\,i,j} + C_R)(V_{dd} - V_T)}{C_F} \text{ for FIG. 24}$$

$$V_{out} = -\frac{(C_{in\,i,j} + C_R)(V_{dd} - V_{ON})}{C_F} \text{ for FIG. 28}$$

With respect to both the 2-transistor structure of FIGS. 24-27 and the transistor-plus-diode structure of FIGS. 28-30, it is possible to connect the positive terminal of the operational amplifier to an arbitrary bias voltage (for example $-V_{Bias}$) to increase the stored charge over the pixel capacitor by increasing the bias voltage from $V_{dd}$ to $V_{dd} V_{Bias}$ across the pixel capacitor. Under this condition, the Enable line should be biased at $-V_{Bias}$ during the disable stage.

A calibration step can be applied occasionally to determine the IV characteristics of the sense TFT or diode across the array by measuring the current flowing through the device during the Enable step.

begins at step 3110, where a driver module asserts a row select line high to couple a sense element to an enable line through a first transistor. The row select line is coupled to a gate terminal of the first transistor, and a first terminal of the first transistor is coupled to the sense element. The enable line is coupled to a second terminal of the first transistor.

At step 3120, a charge is collected at the sense element, where the charge is proportional to a feature of an input object. The charge may be proportional to a capacitance between an input object (such as a finger) and the sense element. At step 3130, the driver module asserts the row select line and the enable line low to isolate the sense element from the enable line. At step 3140, the charge stored on the sense element is transferred to a feedback capacitor (as a result of step 3130). The charge is transferred through a non-linear circuit element. The non-linear circuit element may be a diode or a transistor-connected diode.

At step 3150, an output voltage is read. The output voltage is proportional to the feature of the input object, and may be used to determine at least a portion of a fingerprint. After the output voltage has been read, the pixel may be reset to prepare for another enable/readout/disable sequence.

Thus, the embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

In view of the foregoing, the scope of the present disclosure is determined by the claims that follow.

What is claimed is:

1. An input device, comprising:
a sensing pixel configured to sense an input object in a sensing region, wherein the sensing pixel comprises a sense element configured to store an electric charge, wherein the electric charge comprises a magnitude corresponding to a feature of the input object; and
a drive/readout circuit comprising:
an amplifier circuit connected to a feedback capacitor and a reset switch;
a first switch configured to connect and disconnect a column output line to a drive voltage; and
a second switch configured to connect and disconnect the column output line to the amplifier circuit;
wherein the drive/readout circuit is configured to:
apply the drive voltage to the sense element;
bias the column output line to ground while the sense element is disconnected from the column output line; and
read out a resulting signal from the sense element.

2. The input device of claim 1, wherein the resulting signal corresponds to a capacitance formed between the sense element and the input object in the sensing region.

3. The input device of claim 1, wherein the drive/readout circuit further comprises a feedback switch, wherein the feedback capacitor is configured to accumulate a charge over one or more charge and discharge cycles of the sense element using the feedback switch.

4. The input device of claim 3, wherein the feedback switch is further configured to connect and disconnect the feedback capacitor to an input of the amplifier circuit.

5. The input device of claim 1, wherein the drive/readout circuit further comprises a third switch configured to connect and disconnect the column output line to system ground, wherein the drive/readout circuit is configured to bias the column output line to ground by closing the third switch.

6. A method for operating an input device, comprising:
applying a drive voltage to a sense element via a first switch configured to connect and disconnect a column output line;
biasing the column output line to ground while the sense element is disconnected from the column output line via a second switch; and
reading out a resulting signal from the sense element.

7. The method of claim 6, wherein the resulting signal corresponds to a capacitance formed between the sense element and an input object in a sensing region.

8. The method of claim 6, wherein a feedback capacitor is configured to accumulate a charge over one or more charge and discharge cycles of the sense element using a feedback switch.

9. The method of claim 8, wherein the feedback switch is further configured to connect and disconnect the feedback capacitor to an input of an amplifier circuit.

10. A processing system for operating an input device, comprising:
a drive/readout circuit comprising:
an amplifier circuit connected to a feedback capacitor and a reset switch;
a first switch configured to connect and disconnect a column output line to a drive voltage; and
a second switch configured to connect and disconnect the column output line to the amplifier circuit;
wherein the drive/readout circuit is configured to:
apply the drive voltage to a sense element;
bias the column output line to ground while the sense element is disconnected from the column output line; and
read out a resulting signal from the sense element.

11. The processing system of claim 10, wherein the resulting signal corresponds to a capacitance formed between the sense element and an input object in a sensing region.

12. The processing system of claim 10, wherein the drive/readout circuit further comprises a feedback switch, wherein the feedback capacitor is configured to accumulate a charge over one or more charge and discharge cycles of the sense element using the feedback switch.

13. The processing system of claim 12, wherein the feedback switch is further configured to connect and disconnect the feedback capacitor to an input of the amplifier circuit.

14. The processing system of claim 10, wherein the drive/readout circuit further comprises a third switch configured to connect and disconnect the column output line to system ground, wherein the drive/readout circuit is configured to bias the column output line to ground by closing the third switch.

15. The processing system of claim 10, wherein the drive/readout circuit is configured to bias the column output line to ground by closing the second switch and the reset switch to bias the column output line to virtual ground.

16. The processing system of claim 10, wherein the amplifier circuit is a lower voltage circuit than the drive voltage.

17. The processing system of claim 10, wherein the drive/readout circuit is configured to address the sense element through a first transistor, wherein the first transistor has a gate terminal connected to a row select line, a second terminal connected to the column output line, and a third terminal connected to the sense element.

18. The processing system of claim 17, wherein the first transistor is a thin-film transistor.

19. The processing system of claim 10, wherein the sense element has a pitch suitable for distinguishing between features of a fingerprint.

20. The processing system of claim 19, wherein the pitch comprises a range of 20 to 100 microns.

* * * * *

UNITED STATES PATENT AND TRADEMARK OFFICE
CERTIFICATE OF CORRECTION

PATENT NO. : 9,958,993 B2
APPLICATION NO. : 14/788604
DATED : May 1, 2018
INVENTOR(S) : Arash Akhavan Fomani et al.

It is certified that error appears in the above-identified patent and that said Letters Patent is hereby corrected as shown below:

In the Specification

In Column 21 Line 46, after "transistor." insert -- The gate of the second transistor is coupled to the second terminal of the first transistor. A --.

In Column 24 Lines 10-15, after "$C_F$." delete "As the output current remains constant, no measured to calibrate the sensor to cancel the effect of device mismatch across the pixel array. During the readout, the sense plate is isolated from the enable line and the charge stored on the sense plate is transferred to $C_F$.".

Figure 31:
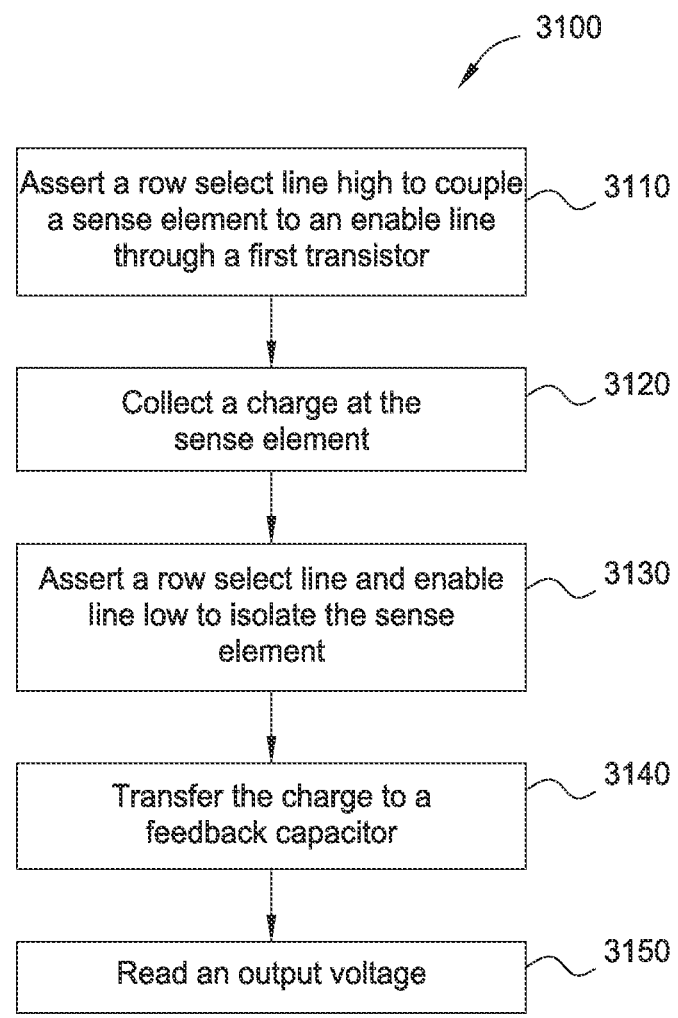
FIG. 31 is a flowchart illustrating a method for operating an input device according to one embodiment.

In Column 24 Line 49, before "begins" insert -- FIG. 31 is a flowchart illustrating a method 3100 for operating an input device, according to one embodiment. The steps of method 3100 may be performed in any suitable order. Method 3100 describes an enable/readout/disable sequence for a fingerprint sensor with a 2-TFT (or one TFT and one diode) pixel architecture. The method --.

Signed and Sealed this
Twenty-eighth Day of August, 2018

Andrei Iancu
*Director of the United States Patent and Trademark Office*